(12) United States Patent
Seibel et al.

(10) Patent No.: US 12,443,536 B1
(45) Date of Patent: Oct. 14, 2025

(54) TECHNIQUES FOR STAGING UPDATED METADATA PAGES BASED ON OWNER AND METADATA

(71) Applicant: Dell Products L.P., Hopkinton, MA (US)

(72) Inventors: Christopher Seibel, Walpole, MA (US); Vamsi K. Vankamamidi, Hopkinton, MA (US); James Vega McCoy, Holliston, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/632,145

(22) Filed: Apr. 10, 2024

(51) Int. Cl.
*G06F 12/0868* (2016.01)

(52) U.S. Cl.
CPC .. *G06F 12/0868* (2013.01); *G06F 2212/7201* (2013.01)

(58) Field of Classification Search
CPC ......... G06F 12/0868; G06F 2212/7201; G06F 3/0656; G06F 12/0866
See application file for complete search history.

(56) References Cited

U.S. PATENT DOCUMENTS

| | | | | |
|---|---|---|---|---|
| 9,152,569 B2* | 10/2015 | Li | ........................ | G06F 12/0811 |
| 11,269,531 B2* | 3/2022 | Cohen | .................... | G06F 3/0608 |
| 11,467,970 B1* | 10/2022 | Tomlin | .................. | G06F 3/0679 |
| 2006/0221420 A1* | 10/2006 | Itakura | ................. | G11B 7/0065 |

* cited by examiner

*Primary Examiner* — Chie Yew
(74) *Attorney, Agent, or Firm* — BainwoodHuang

(57) ABSTRACT

In at least one embodiment, processing can include: receiving a write that writes content to a logical address; recording an entry for the write in a log; flushing the entry from the log; recording, in a metadata log, an update to a metadata page; flushing the update from the metadata log; generating an updated version of the metadata page including the update; staging the updated version of the metadata page to a staging area of a plurality of partitions, comprising: selecting a partition of the staging area based on: a partition owner of the partition, a page owner of the metadata page, a type of the metadata page, and a second type of the first partition; selecting a zone of the partition based on a processing node performing said staging; and writing the updated version of the metadata page to the zone of the partition.

19 Claims, 23 Drawing Sheets

| Partition 1 1301 | Partition 2 1302 | Partition 3 1303 | Partition 4 1304 |
|---|---|---|---|
| 1301a Partition Owner<br>Node A | 1302a Partition Owner<br>Node A | 1303a Partition Owner<br>Node B | 1304a Partition Owner<br>Node B |
| 1301b Page types top, mid, leaf MD pages. | 1302b Page types VLB pages. | 1303b Page types top, mid, leaf MD pages. | 1304b Page types VLB pages. |
| (e.g., MD partition for top, mid and leaf MD pages owned by Node A; Partition owner node A destages or writes out content from partition 1301 to BE non-volatile storage.) | (e.g., VLB partition for VLB pages owned by Node A; Partition owner node A destages or writes out content from partition 1302 to BE non-volatile storage.) | (e.g., MD partition for top, mid and leaf MD pages owned by Node B; Partition owner node B destages or writes out content from partition 1303 to BE non-volatile storage.) | (e.g., VLB partition for VLB pages owned by Node B; Partition owner node B destages or writes out content from partition 1304 to BE non-volatile storage.) |

| LA 1704 | Translation table (TT) 1702 Physical address or location 1706 | Generation number or GSN 1708 |
|---|---|---|
| LA1 | PLB1, offset1 | GSN99 |
| LA15 | Partition3, offset10 | GSN4 |
| .. | .. | .. |
| .. | .. | .. |

FIG. 16

TECHNIQUES FOR STAGING UPDATED METADATA PAGES BASED ON OWNER AND METADATA

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a storage system, a first write from a host, wherein the first write writes first content to a first logical address; recording a first entry for the first write in a log; flushing the first entry from the log; responsive to said flushing the first entry, recording, in a metadata log, a first update to a first metadata page of a chain of pages that maps the first logical address to a first storage location or address storing the first content of the first logical address; flushing the first update to the first metadata page from the metadata log; generating an updated version of the first metadata page, wherein said generating the updated version of the first metadata page includes applying the first update to an existing version of the first metadata page; and staging the updated version of the first metadata page to a staging area of a plurality of partitions, comprising: selecting a first partition of the staging area based on: a first partition owner of the first partition, a first page owner of the first metadata page, a first metadata type of the first metadata page, and a second metadata type of the first partition; selecting a first zone of the first partition based on a processing node performing said staging to write the updated version of the first metadata page to the staging area; and writing the updated version of the first metadata page to a first location in a first region of the first zone of the first partition.

In at least one embodiment, selecting the first partition can include determining that the first partition owner matches the first page owner. Selecting the first partition can include determining that the first metadata type of the first metadata page matches the second metadata type of the first partition. The first zone can be included in a first plurality of zones of the first partition. The first zone can have a first zone owner identifying a first particular node allowed to file or write to the first zone. A second particular processing node can perform said staging to write the updated version of the first metadata page to the staging area. Selecting the first zone can include determining that the first particular node, that is the first zone owner, matches the second particular node, that performs said staging to write the updated version of the first metadata page to the staging area. The storage system can include a first node and a second node, wherein the first node exclusively stages updated metadata pages to one of the first plurality of zones of the first partition, wherein the second node exclusively stages updated metadata pages to another one of the first plurality of zones of the first partition.

In at least one embodiment, processing can include destaging a first plurality of updated metadata pages, including the updated version of the first metadata page, from the first region of the first partition to back-end non-volatile storage. The storage system can include a first node and a second node, wherein the first partition owner can be the first node, and wherein the first node as the first partition owner can be responsible for destaging content from the first partition to the back-end non-volatile storage, and wherein the first node can perform said destaging the first plurality of updated metadata pages from the first region to the back-end non-volatile storage. The first node can destage content from each region of the first partition responsive to said each region being filled with content. The first partition can be divided into a first plurality of regions, wherein each of the first plurality of regions can be one of a defined set of states including: a filling state, a fillable state, a filled state and a destaging state. The first region can be in any of the fillable state and the filling state when the updated version of the first metadata page is written to the first location in the first region of the first zone of the first partition.

In at least one embodiment, processing can include: determining that the first region is full of updated metadata pages while the first region is in the filling state; responsive to determining that the first region is full while in the filling state, transitioning the first region from the filling state to the filled state; and responsive to said determining that the first region is in the filled state, performing processing including: transitioning the first region from the filled state to the destaging state; and performing said destaging the first plurality of updated metadata pages from the first region of the first partition to the back-end non-volatile storage. Processing can include transitioning the first region from the destaging state to the fillable state once said destaging the first region to the back-end non-volatile storage has completed. Processing can include: acquiring a first plurality of exclusive locks for a first plurality translation table entries corresponding to the first plurality of updated metadata pages of the first region, where each of the first plurality of metadata pages of the first region has a corresponding one of the first plurality of translation table entries that maps a respective logical address of said each updated metadata page to a current physical address or location of said each updated metadata page; and responsive to said acquiring, updating the first plurality of translation table entries to map a first plurality of logical addresses of the first plurality of updated metadata pages to a first plurality of respective storage locations on the back-end non-volatile storage. Subsequent to updating the first plurality of translation table entries, processing can include releasing the first plurality of exclusive locks for the first plurality translation table entries.

In at least one embodiment, processing can include: prior to said staging the updated version, acquiring a first exclusive lock on the first metadata page; responsive to writing the updated version of the first metadata page to the first location in the first region of the first zone of the first partition, performing processing including: acquiring a second exclusive lock on a first translation table entry that maps a logical address of the first metadata page to a corresponding physical address or location of the first metadata page; and updating the first translation table entry to map the logical address of the first metadata page to the first location of the first region of the first zone of the first partition in the staging area; and subsequent to said updating the first translation table entry, releasing the first exclusive lock and the second exclusive lock. Processing can include: receiving a first request to read the first metadata page; determining that the first metadata page is not stored in a cache; querying a translation table to determine a current physical location or address of the first metadata page, wherein the translation table includes a first entry mapping a logical address of the first metadata page to the current physical location or address of the first metadata page; obtaining a current copy of the first metadata page from the current physical location or address as denoted by the first entry; and returning the current copy of the first metadata page in response to the first request to read the first metadata page. The updated version of the first metadata page can be stored in the staging area and the first entry maps the logical address of the first metadata page to the first location in the staging area as the current physical address or location of the first metadata page.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6, 7, 9, 10, 11A, 11B, 14 and 16 are examples illustrating structures and data flows in at least one embodiment in accordance with the techniques of the present disclosure.

FIGS. 12A and 12B illustrate a layout or configuration of a staging area in at least one embodiment in accordance with the techniques of the present disclosure.

DETAILED DESCRIPTION OF EMBODIMENT(S)

Figure 1:
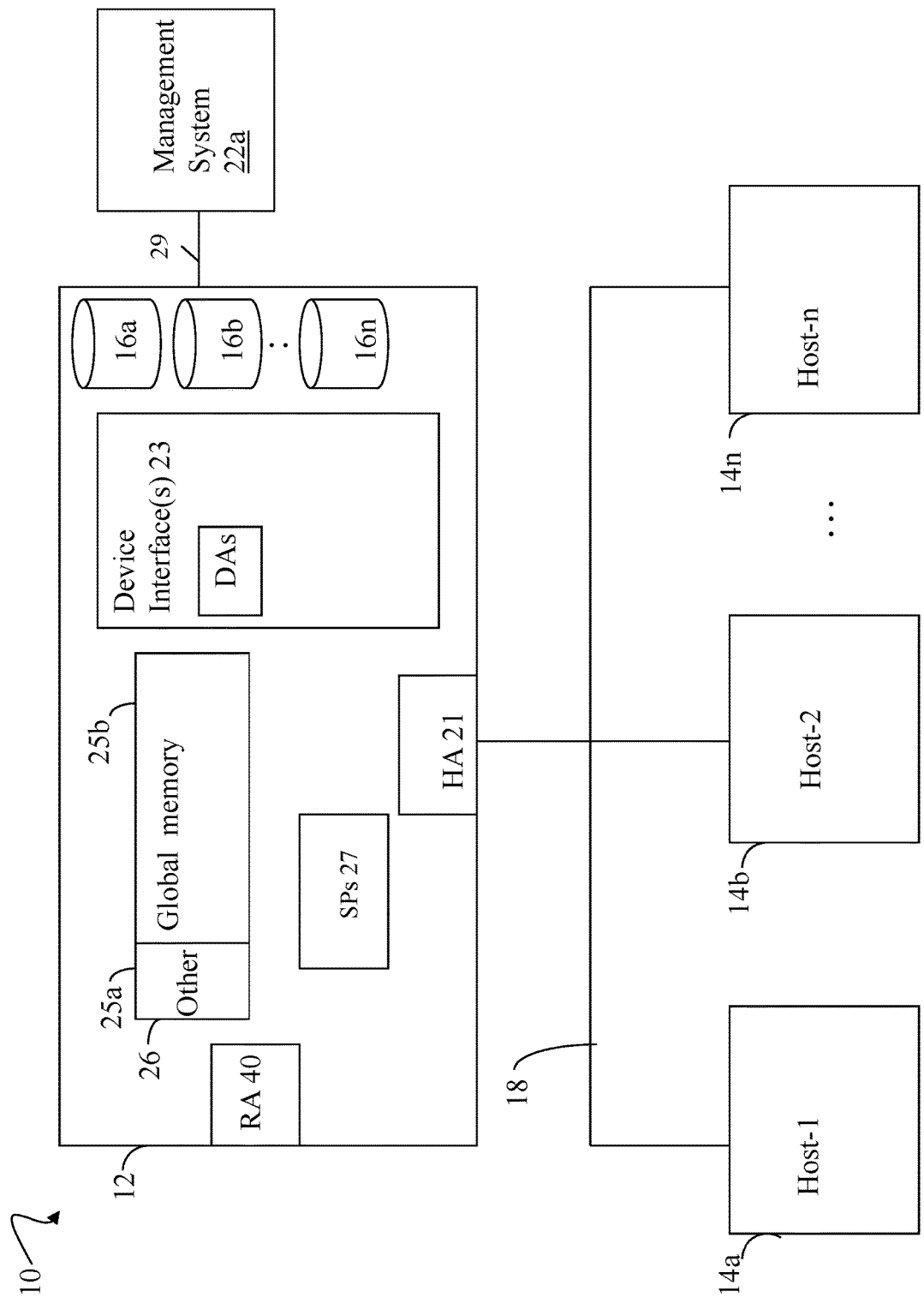
FIG. 1 is an example of components that may be included in a system in accordance with the techniques of the present disclosure.

A data storage system can use a log for recording user or client content updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address.

Updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

The data storage system can maintain the user data or client data, as stored persistently on non-volatile BE storage, as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be stored persistently using in-place updates or overwrites such that processing overwrites the existing version of a MD page as stored at a physical storage location on the BE PDs with an updated version of the MD page. The physical storage location (e.g., on BE PDs) of each MD page can thus remain static or fixed so that in-place updates overwrite the same existing persistent physical storage location of the MD page. With mapping information including a chain of MD pages that reference each other using such physical storage locations, such in-place updates or overwrites of MD pages can be desirable where each MD page remains in the same physical storage location on BE storage.

As an alternative in an embodiment in accordance with the techniques of the present disclosure, the persistent or non-volatile physical storage, such as on the BE PDs, used for storing the MD pages can be maintained as an LSS in a manner similar to the LSS storing user data or content. With an LSS for MD pages, an updated MD page can be determined as a result of applying one or more entries of the metadata log which update the MD page. A current version of the MD page (before applying the updates) can be stored at an existing physical storage location on non-volatile persistent storage (e.g., on BE PDs). The updated version of the MD page can be determined and then rewritten or stored at a new physical storage location that is different from the existing physical storage location. Thus, with an LSS for metadata, the physical storage location or address of the MD page can move or change each time an updated version of the MD page is written to the BE PDs, where such updated version of the MD page can be the result of flushing one or more entries from the metadata log which update the same MD page, and then persistently storing the updated version of the MD page at the new physical storage location on the BE PDs. Persistent physical storage for a MD page can be allocated at a physical address from the BE PDs.

In at least one embodiment in accordance with the techniques of the present disclosure providing for storing updated MD pages at new physical storage locations in an LSS rather than performing overwriting or in-place updates, logical addresses of MD pages can be used to reference the MD pages as opposed to referencing MD pages, and entries thereof, using physical storage locations or addresses. In at least one embodiment, the logical address of a MD page can be an indirect pointer or indirect address of the corresponding physical storage location or address of the persistently stored MD page. In at least one embodiment, a logical address of a MD page can be mapped to the physical address or storage location on the BE PDs where the MD page is stored. Thus, as the MD page is updated and its corresponding physical storage location changes over time, the logical address of the MD page can remain the same and the physical storage location or address on the BE PDs storing the persisted MD page can be allowed to change. When the logical address of the MD page is used to reference the MD page from the BE PDs, the logical address of the MD page can be translated or mapped to its current physical storage location on the BE PDs. Thus, designing an LSS for storing the MD pages can generally include some form of dynamic translation of logical to physical addresses or locations for the MD pages.

In at least one embodiment in accordance with the techniques of the present disclosure, a translation table (TT) can be used to map or translate a logical address of a MD page to its current physical storage location or address such as on BE PDs providing non-volatile storage. In at least one embodiment, as the physical storage location of a MD page changes from a first physical storage location or address PA1 to a second physical storage or address PA2, the TT used to map the MD page's logical address to the new physical storage location can also be updated. In at least one embodiment, the TT can be updated to reference the new physical storage location PA2 of the MD page rather than the prior physical storage location PAL. In at least one embodiment, the logical addresses of the MD pages can remain the same even though the physical addresses or storage locations of persistently stored versions of the MD pages can change as the MD pages are updated and rewritten to new physical addresses or storage locations in accordance with the LSS.

In at least one embodiment of the techniques of the present disclosure, the TT can be persistently stored on non-volatile storage such as the BE PDs. In at least one embodiment, the TT can also be stored in volatile memory included in a cache.

As MD page updates are flushed or destaged from the MD log and then applied to the corresponding MD pages, updated MD pages are generated. The updated MD pages can then be persistently stored by writing out the updated MD pages to BE non-volatile storage. In at least one embodiment, rather than issue a single small write for writing out each individual updated MD page to BE non-volatile storage, multiple updated MD pages to be written out to BE non-volatile storage can be grouped together and collectively written out to the BE non-volatile storage as large sequential writes to support the LSS processing for the MD. In at least one embodiment, the updated MD pages generated as a result of applying updates destaged or flushed from the MD log can be collected or accumulated in a persistent temporary staging area or buffer of a specified size. In at least one embodiment, the staging area or buffer can generally have a size that is much larger than each updated MD page. For example in at least one embodiment, the persistent buffer or staging area can have a size capable of storing 512 updated MD pages. Once the staging area or buffer is full, the buffer of multiple updated MD pages can be efficiently written out to BE non-volatile storage as a large sequential write to support the log structured processing of the MD. Issuing a single large write of a group of updated MD pages of the buffer can be more efficient that issuing a larger number of writes to store the same group of updated MD pages.

In at least one embodiment, the persistent buffer or staging area can be partitioned into regions each the size of a single chunk of multiple metadata pages written to BE non-volatile storage. In at least one embodiment, the size of each region of the staging area can be the size of a single stripe write to BE non-volatile storage. In at least one embodiment, the size of each region can be 2 MB, where 2 MB is also the size of a single stripe write across non-volatile BE storage.

In some implementations, exclusive locks or write locks can be held on the updated MD pages while the updated MD pages are temporarily stored in the staging area. Such exclusive locks can continue to be held until the updated MD pages are destaged from the staging area and written out to the BE non-volatile storage. As a result of accumulating the updated MD pages in the persistent staging area and continuing to hold exclusive locks on the updated MD pages while waiting for the staging area to become full for further destaging and storing on BE non-volatile storage, there can be increased contention in the system due to such exclusively locked MD pages. For example, an exclusively locked MD page waiting in the staging area during an accumulation period can resulting in blocking one or more other threads, processes and the like, that may want to access the exclusively locked MD page of the staging area. The increased contention can further result in an adverse performance impact due to the foregoing blocking.

Accordingly, in at least one embodiment, the techniques of the present disclosure can be used to provide a unique arrangement for collecting or accumulating dirty updated MD pages into the staging area. In at least one embodiment, the unique arrangement and organization of the staging area provides efficiency in storing the updated MD pages in the staging area, and also provides for efficiency in further destaging or writing out the contents (e.g., updated MD pages) of the staging area to BE non-volatile storage used for a MD LSS.

In at least one embodiment, the techniques of the present disclosure can result in reduced contention with respect to the MD pages while in the staging area. In at least one embodiment, an exclusive lock is not held on an updated MD page in the staging area for the duration of time while waiting for the staging area to become full and then destaging the contents of the staging area. In at least one embodiment, a requester or client, such as an executing process or thread, can issue a request to a service to stage or write an updated MD page to the staging area. In at least one embodiment, the request can more generally be a request to write or store the updated MD page in the MD LSS. In at least one embodiment, prior to issuing the request, the requester can hold an exclusive lock or a write lock on the MD page. The service can generally perform a staging operation or workflow including storing the updated MD page in the staging area. Once the staging operation or workflow is complete whereby the updated MD page has been staged or written to the staging area, the service can return an acknowledgement to the requester. In at least one embodiment, once the client or requester receives the acknowledgment, the client or requester can release the exclusive lock held on the now staged updated MD page. In this manner in at least one embodiment, the updated MD page can be subsequently further accessed, for example, such as for reads, while stored in the staging area during a period of time while waiting for a large set of updated MD pages to accumulate in order to perform a large sequential write of the set of updated MD pages. Thus in at least one embodiment, updated MD pages can be stored in the staging area for the period of time while waiting to be further destaged and written out to BE non-volatile storage, where the staged updated MD pages can be accessed by other threads or processes during the period of time. The foregoing as performed in at least one embodiment can result in a reduction in contention for the staged updated MD pages as opposed to, for example, holding exclusive locks on the updated MD pages while in the staging area and until the updated MD pages have been written out to BE non-volatile storage.

In at least one embodiment, the techniques of the present disclosure provide for efficiently collecting or accumulating updated MD pages in a staging area that supports random writes of a particular write granularity that is the size of a single MD page. In at least one embodiment of the techniques of the present disclosure, updated MD pages can be held in the staging area and accessed in the staging area while waiting until the staging area has a sufficient number of updated MD pages to efficiently perform a large sequential write of the accumulated updated MD pages to a log-structured MD tier (e.g., the MD LSS) of the BE non-volatile storage. In at least one embodiment, the foregoing large sequential write can be performed independently of client transactions with respect to clients or requesters that write updated MD pages to the staging area and/or MD LSS.

In at least one embodiment, the techniques of the disclosure introduce a new design that can be used to collect dirty or updated MD pages into the staging area that efficiently supports random writes of MD pages to the staging area. In at least one embodiment, writing MD pages into the staging area in accordance with the techniques of the present disclosure does not introduce additional latency or contention to the client. In accordance with the techniques of the present disclosure in at least one embodiment, updated MD pages can be held and accessed while in the staging area until a sufficient number of updated MD pages have been collected in the staging area to execute a large sequential write to the log structured MD tier. The large sequential write can occur out of band with respect to client transactions or requests to stage content to the staging area. In at least one embodiment where a client or requester requests that updated MD pages be written to the MD LSS on BE non-volatile storage, the updated MD pages can be temporarily held in the staging area without having the client or requester continue to hold respective exclusive locks or write locks for such updated MD pages once a workflow, that stores the updated MD pages in the staging area, has completed. In this manner in at least one embodiment, the client or requester can release the exclusive locks on the updated MD pages once stored in the staging area rather than have the client or requester continue to hold the exclusive locks until the corresponding MD pages have been destaged or written to the MD LSS on be non-volatile storage.

It should be noted that in various contexts herein, MD or metadata can be used to generally denote any type of metadata page such as top, mid, leaf and VLB pages, and in other contexts can refer to particular types of the metadata pages such as top, mid and leaf MD pages without including VLB pages.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI, and/or NVMe (Non-Volatile Memory express)), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more non-volatile solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices, MLC (multi level cell) devices, TLC (triple level cell) devices and/or QLC (quad level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDs 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system.

For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
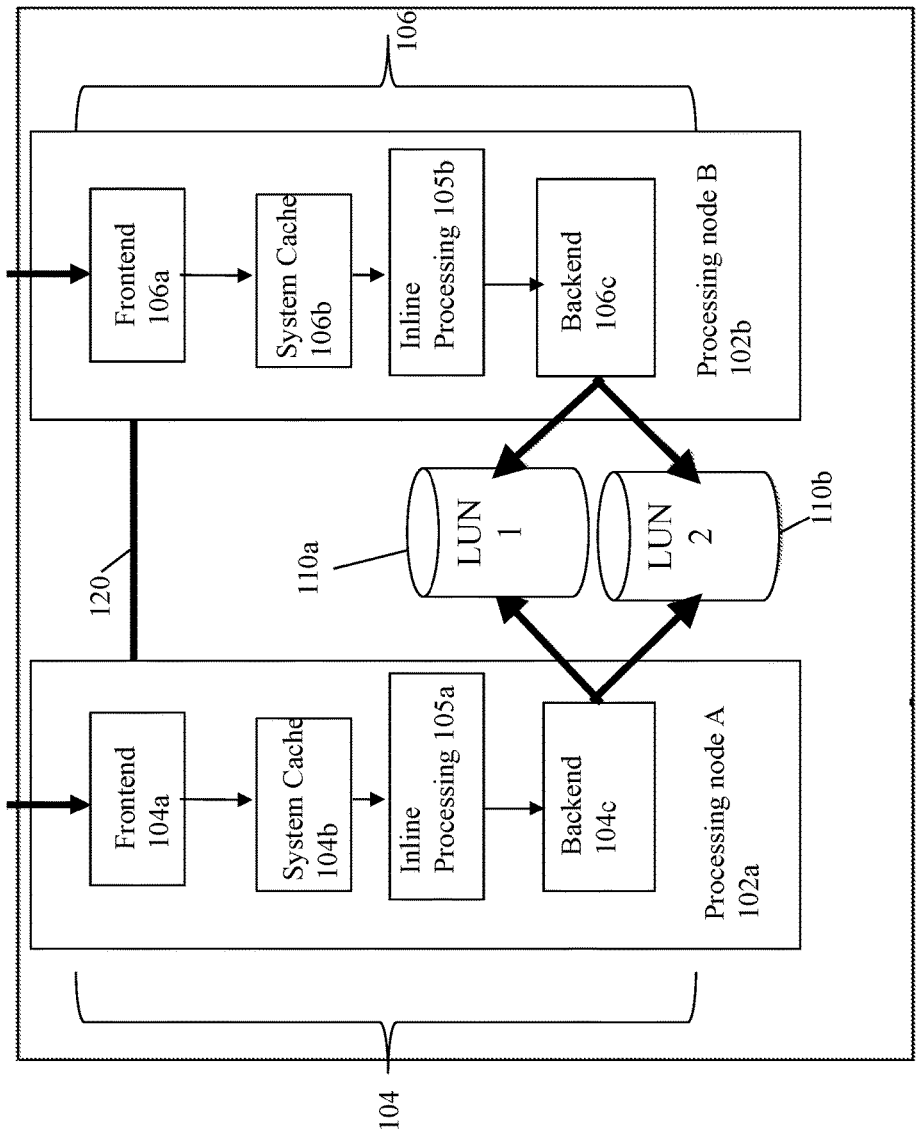
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein. The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
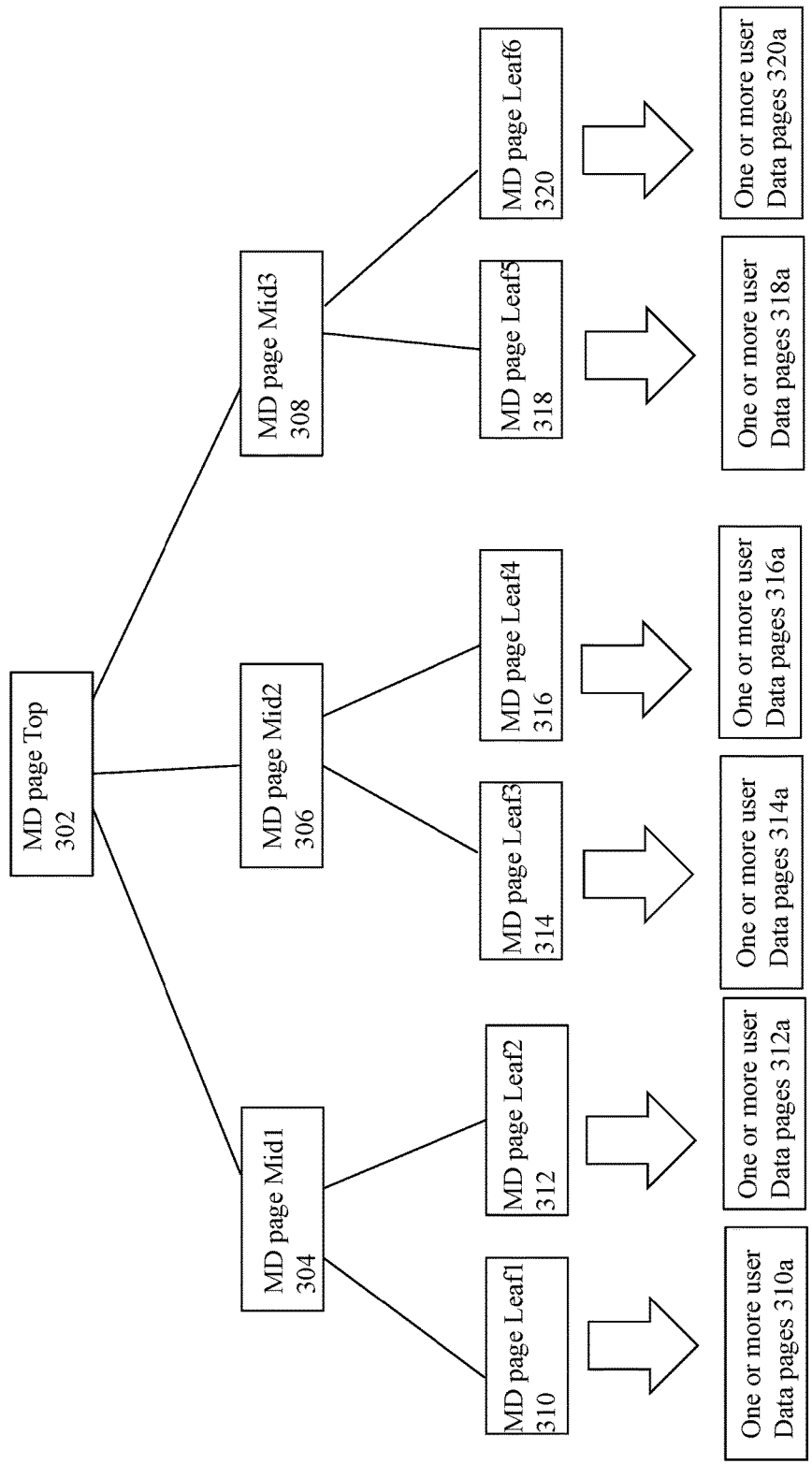
FIGS. 3, 4 and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
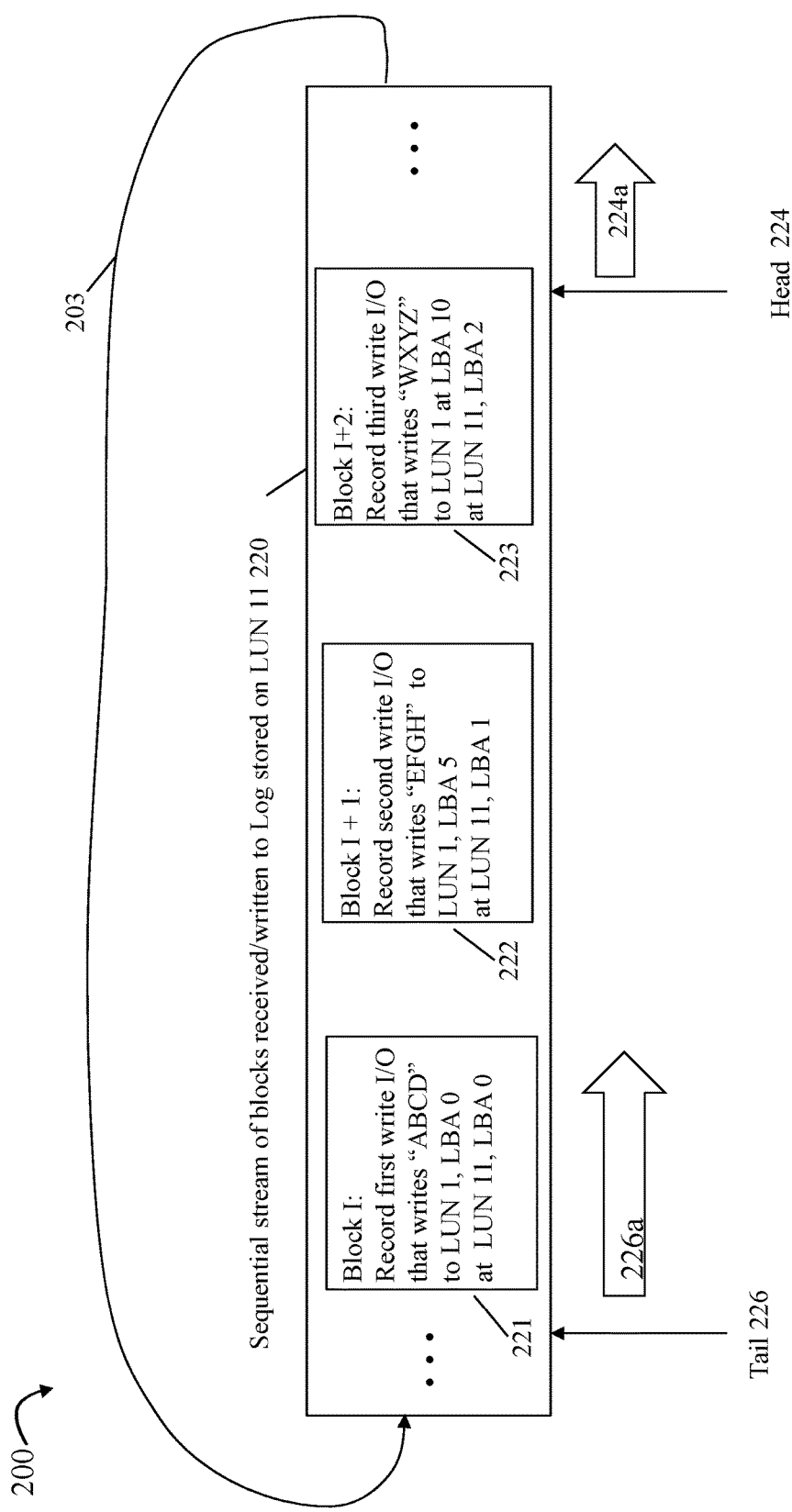
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
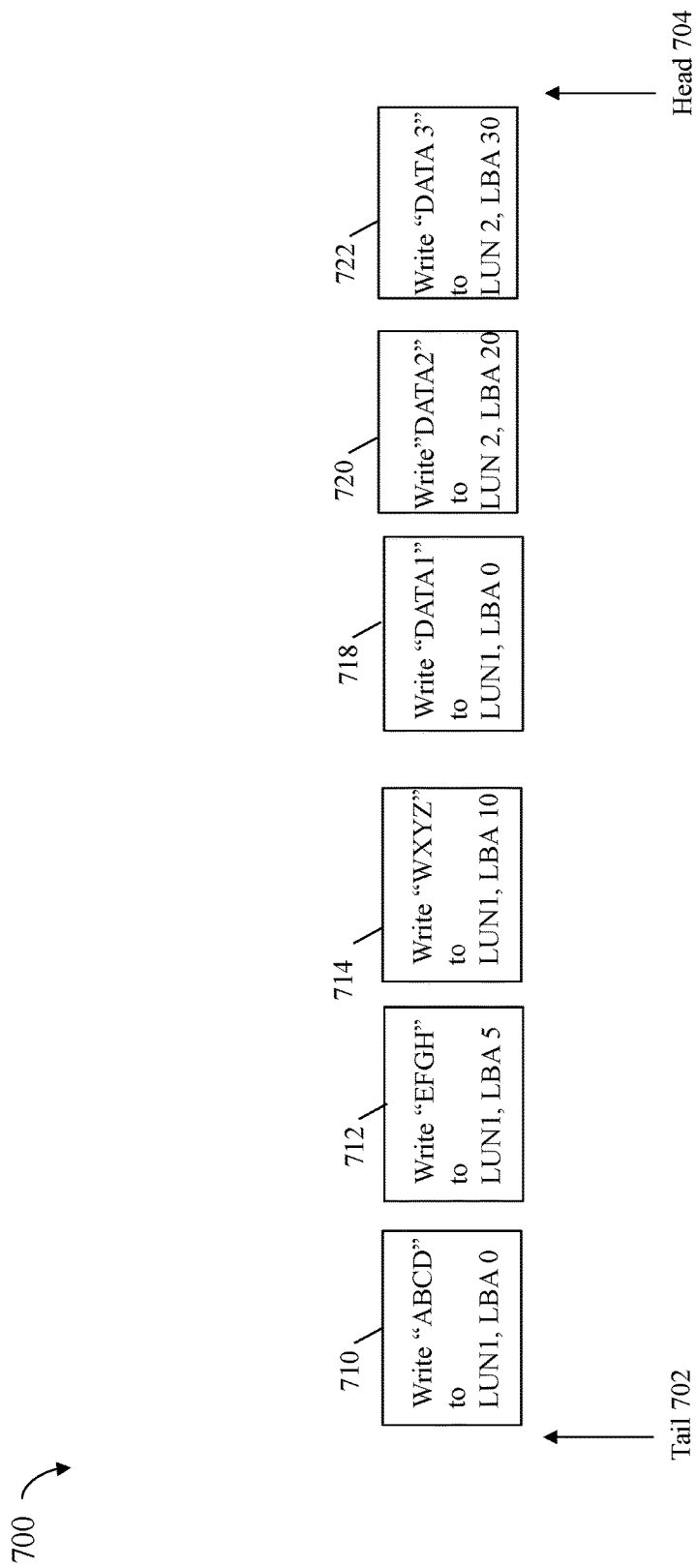

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
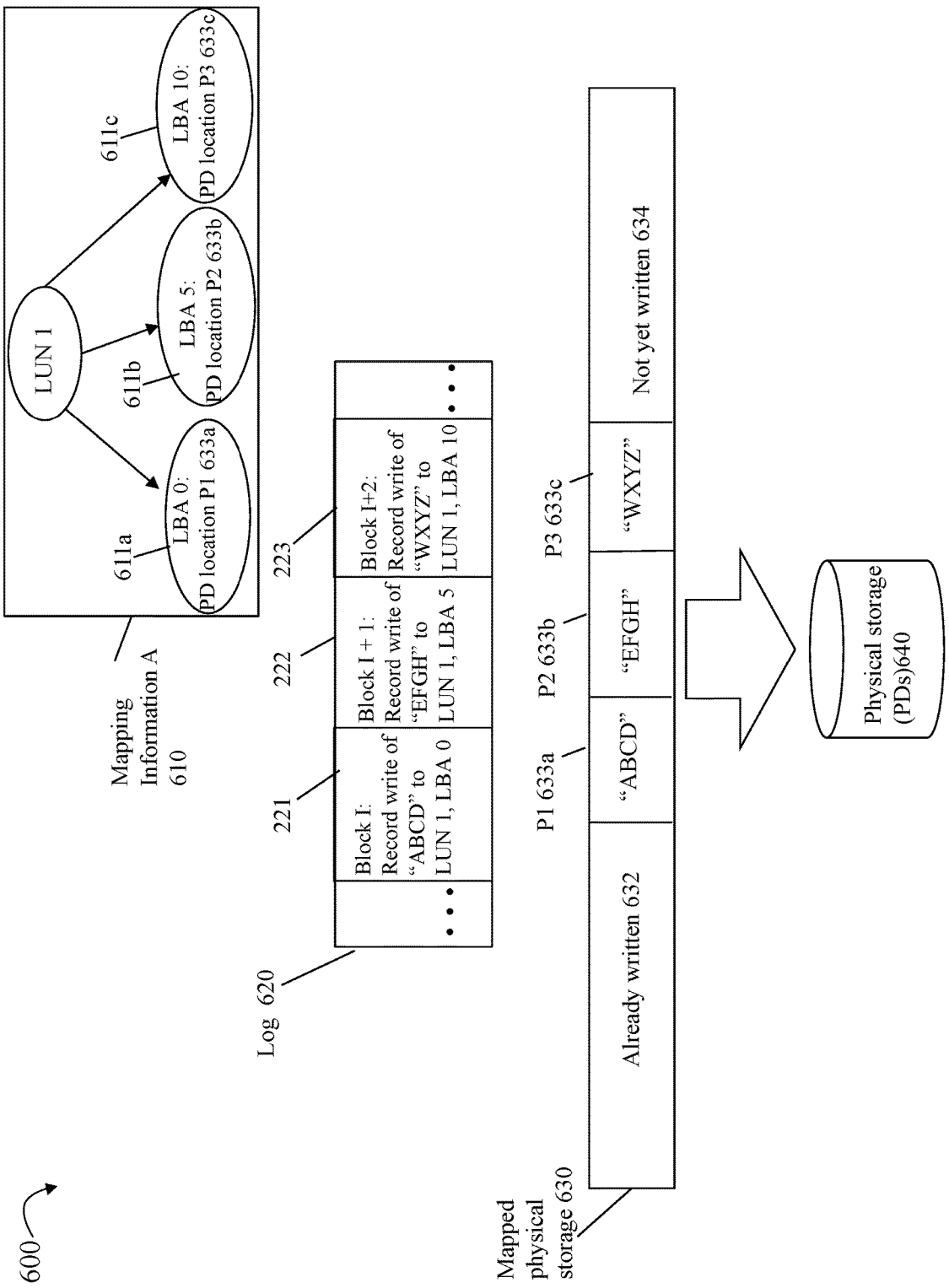

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
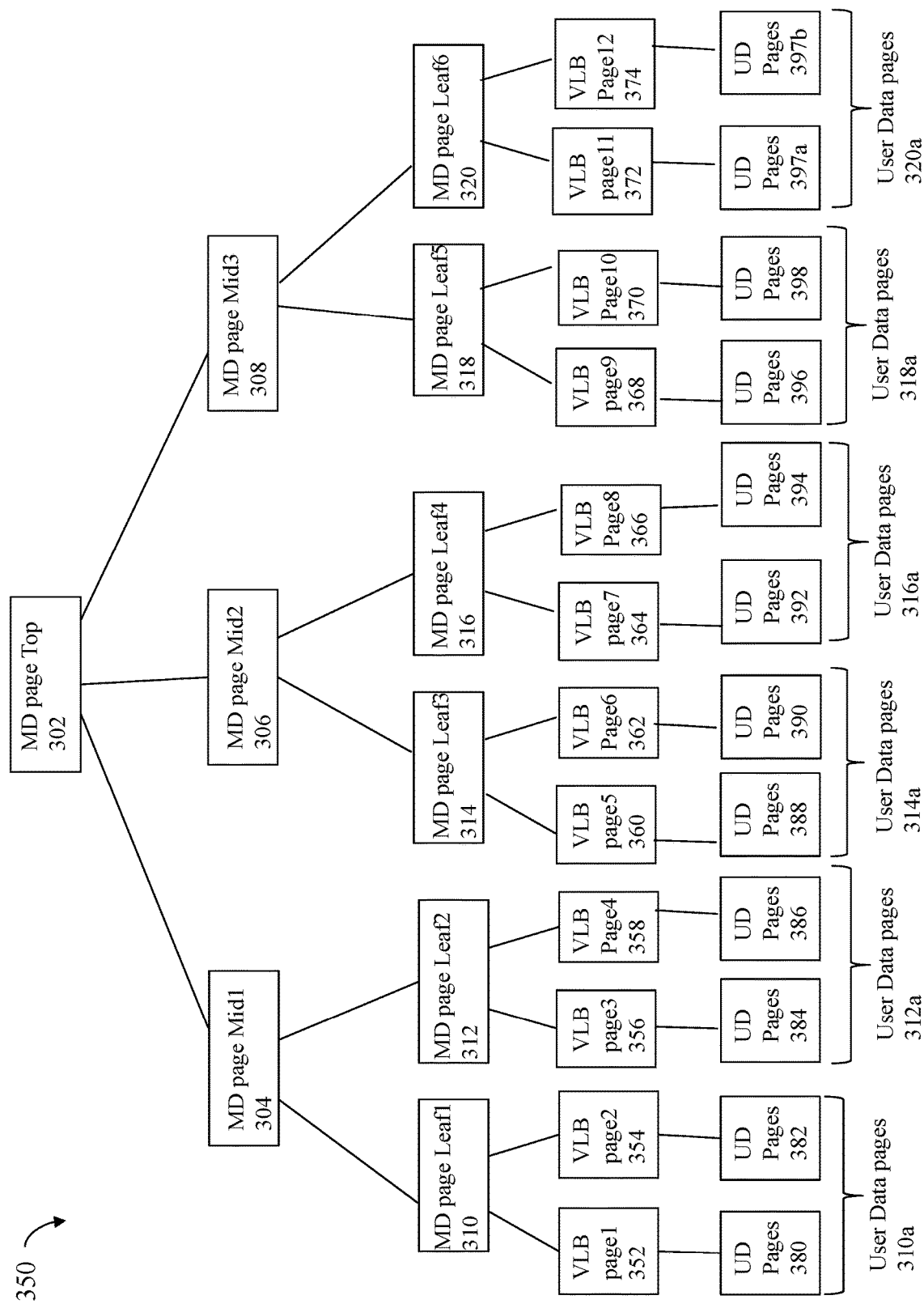

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559.

The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
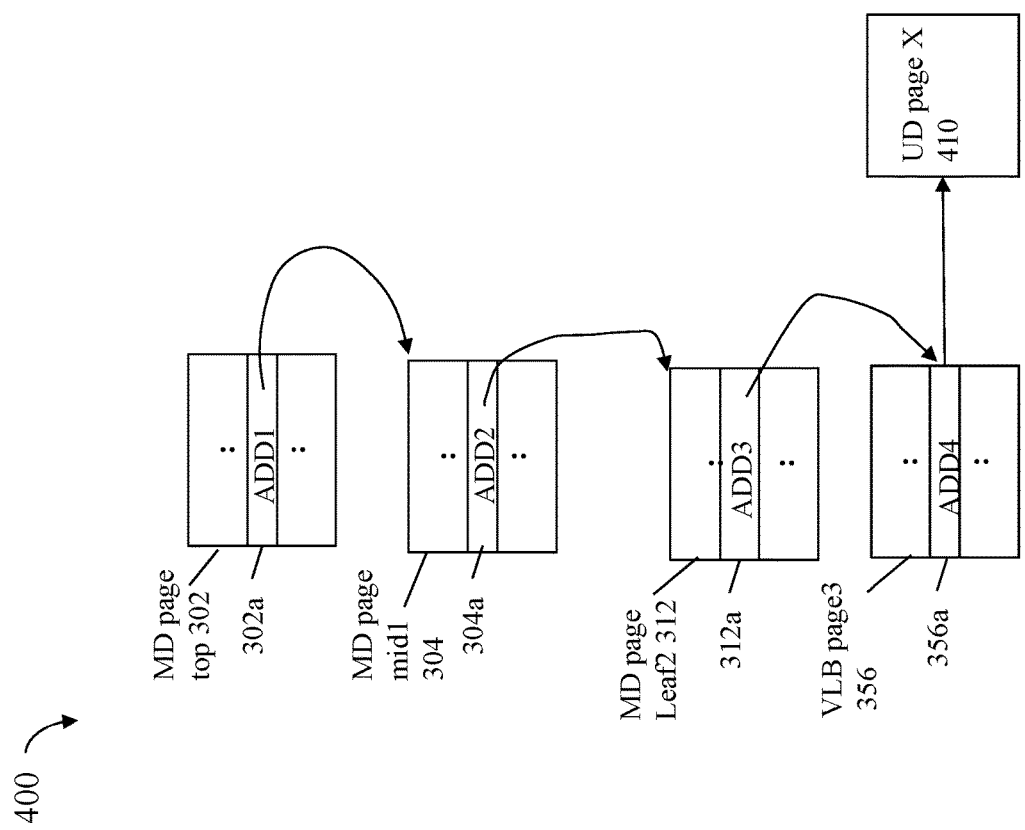

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

In at least one embodiment, each VLB can be a VLB page or node as described herein including multiple entries, such as 512 entries, where each such VLB entry can include one or more fields of information such as the address or pointer to a physical storage location of stored content or data. Additionally in at least one embodiment, each VLB entry pointing to or associated with stored content or data can also include a reference count denoting a number of references or logical addresses that store the content or data. In at least one embodiment, multiple MD leaf entries corresponding to multiple logical addresses of used data or content can all reference or point to the same VLB entry thereby denoting that such multiple logical addresses all store the same content or data associated with the VLB entry.

The reference count of a VLB entry can be updated in connection with deduplication processing and/or as used data or content stored at various logical addresses changes. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-5.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-5). In at least one embodiment, the LI can denote or can be the logical address, offset or location of the MD page. In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 6:
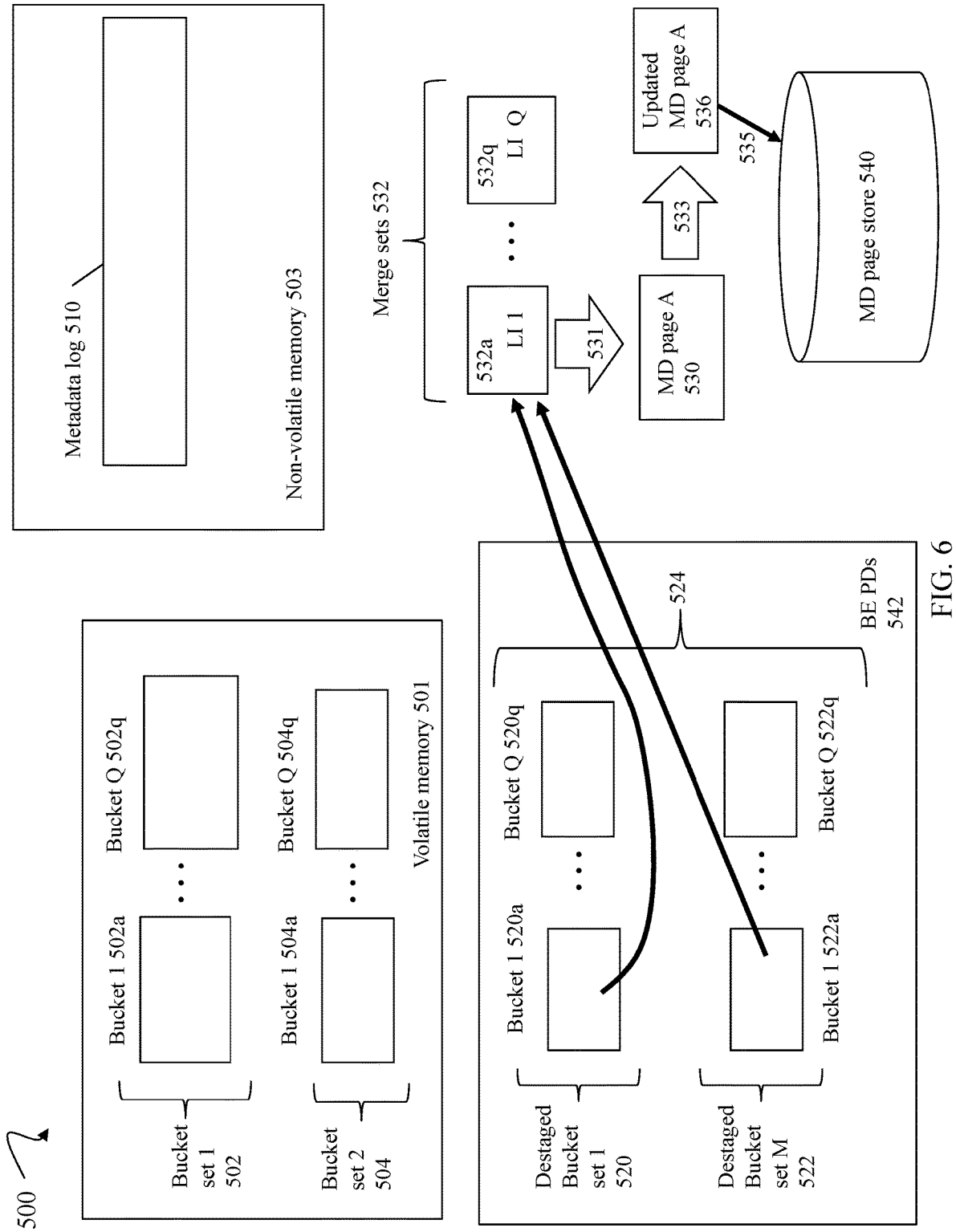

Referring to FIG. 6, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of MD log destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection (GC) can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating MD of any of the top, mid, leaf, and VLB metadata pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, leaf MD page and VLB page, where each MD page in the sequence can be accessed serially and also in the strict consecutive order of the sequence since a first page of the sequence can reference a next consecutive page, or location thereof, in the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other by their physical block-addresses. In at least one embodiment, each MD page when allocated can be assigned a unique physical storage address, offset or location on non-volatile storage where the MD page is persisted. In a model or system using physical addresses or locations without corresponding logical addresses, there is generally no flexibility to move a MD page from an existing physical location to a new physical location since all MD pages referencing the to-be-moved MD page would have to be found and their references would need to be updated to reference the new physical location. Put another way, in at least one system not using the techniques of the present disclosure, the chain or MD pages of mapping information can include pages of metadata that reference other pages of metadata by their physical storage locations or addresses. As a result, metadata can be typically implemented as an in-place over-write system. In such a system, MD pages can remain in the same physical locations where updates to the MD pages are performed in-place and overwrite the same existing physical location. In such a system where MD pages can reference each other by their corresponding physical storage locations or addresses, if an updated version to a MD page is rewritten to a new physical location, all references to the MD page by other MD pages would also have to undesirably be updated to refer to the new physical location. Thus, the MD pages can be persistently stored at fixed physical addresses such as on non-volatile BE PDs of the storage system. The BE PDs used to store the metadata using overwrites or in-place updates can be configured as RAID-level storage of one or more RAID groups. For performance reasons, metadata may have to be stored in a mirrored RAID configuration, such as a RAID-1 configuration, which has a small write performance cost for such in-place updates in comparison to an alternative parity-based RAID configuration such as RAID-5 or RAID-6. However, although the mirrored RAID configuration for the metadata may have less write performance costs as compared to parity-based RAID configurations, the mirrored RAID configuration can generally result in excessive use of storage capacity in comparison to the RAID parity-based configurations. Additionally, because of MD pages referencing each other by physical addresses or physical storage locations, defragmentation and reclaiming of capacity allocated to metadata may become an intractable problem. Furthermore, in systems where the BE PDs or storage tier used to store the metadata are SSDs (solid state drives) such as flash-based storage, continually updating by overwriting to the same SSDs can result in exceeding a maximum number of allowed daily writes (writes per day or WPD) thereby leading to SSD wear out. The SSDs such as flash-based storage can be optimized for use in LSSs where writes to a logical storage object, such as a MD page, are written to a new physical location each time the MD page is updated. Thus, in systems where the MD pages are persistently stored on non-volatile SSDs as the BE PDs, the SSDs can implement an internal LSS where it can be further advantageous to implement a LSS of the metadata at the system level to further facilitate minimizing write amplification and reducing SSD wear.

Based on the foregoing, there exists motivation to implement the persistent metadata storage, such as on one or more storage tiers of the BE PDs, as a LSS which does not perform in place metadata updates and does not update an existing MD page stored at a physical address or location by overwriting current content of the physical storage address or location of the MD page with the new or updated content. Rather, in a LSS, updates to the metadata can be performed by writing the updated version of a MD page to a new physical location each time the MD page is updated.

However, use of a LSS metadata system where each updated version of a MD page is written to a new physical location creates new challenges. Since the MD pages can reference one another, it can be impractical and undesirable to have the MD pages reference each other by their physical storage locations since, for example, storing an updated version of a first MD page to a new physical location would require updating all other referencing MD pages to now refer to the new physical location. As a result, MD pages can reference each other using logical addresses which can then be mapped by an intervening layer or mechanism to corresponding physical addresses or physical locations. In at least one embodiment, the logical addresses of the MD pages, including top, mid, leaf and VLB metadata pages, can be indirect pointers or addresses that indirectly reference the physical storage addresses and locations of the MD pages through the intervening layer or mechanism. The intervening layer or mechanism can maintain a new type of mapping that, for MD pages, translates a logical address of a MD page to its current corresponding physical address or location. In this manner, a first MD page can reference a second MD page, or entry thereof, using a logical address of the second MD page. The new type of mapping can use a translation table, sometimes generally referred to herein as a TT, to map the logical address of the second MD page to its corresponding current physical location. When the second MD page is updated so that the updated version is stored at a new physical location, the TT can be updated to reference the new physical location of the second MD page and where the first MD page can continue to reference the second MD page using the logical address that is mapped, by the TT, to the new physical location. In at least one embodiment, each MD page can be assigned a logical address included in the TT where the logical addresses of the MD pages can remain fixed or the same for the lifetime of the MD pages, and where the physical storage locations or addresses of persistently stored copies of the MD paged can change over time as updated versions of the MD pages can be continually rewritten to new physical storage locations or addresses. The TT can translate a logical address, offset or location (LPA) of a MD page to its corresponding physical address, offset or location (PPA).

In at least one embodiment, as updated MD pages are stored in new physical addresses or storage locations over time, corresponding TT updates can be made to the TT to reflect the current physical address or storage location of MD pages at various points in time. In at least one embodiment, TT updates to the TT can also be managed and handled in accordance with a LSS where the TT itself can be characterized generally as another type of metadata.

In at least one embodiment, pages of metadata can be persistently stored in storage units denoted as PLBs (physical large blocks) in a metadata (MD) tier of non-volatile storage. Each PLB of metadata can have a corresponding PLB descriptor that generally describes content or data stored in the corresponding PLB. As a metadata page is updated and stored in a new physical address or storage location of a target PLB in accordance with a LSS, the target PLB's corresponding descriptors can also be updated to reflect the metadata page now stored in the target PLB. In at least one embodiment, such updates to a descriptor of the target PLB of metadata can also be managed and handled in accordance with an LSS.

Figure 7:
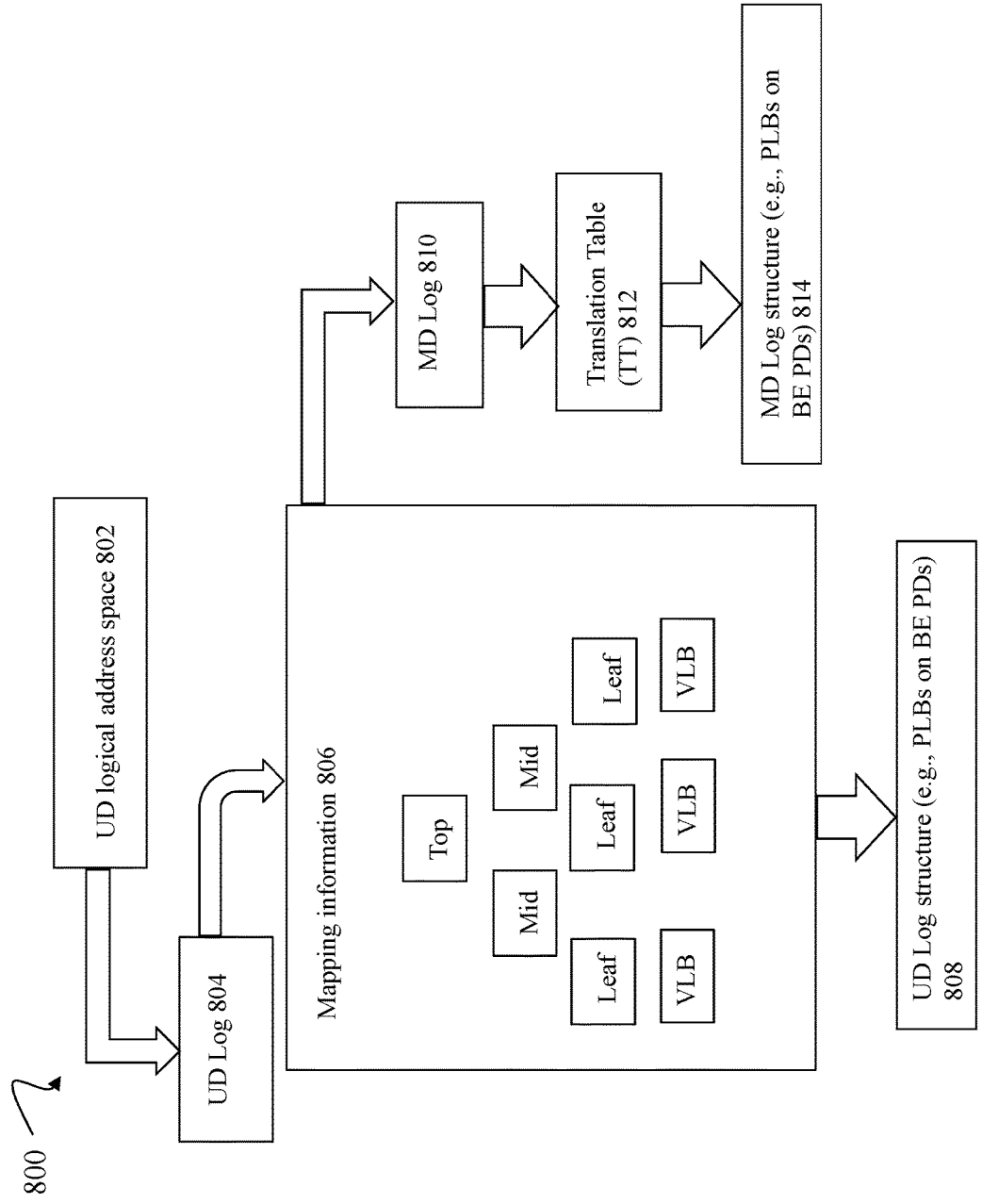

Referring to FIG. 7, shown is an example 800 illustrating components of a log structured MD architecture in at least one embodiment in accordance with the techniques of the present disclosure.

The example 800 provides a component level view of functionality regarding log structured mapping metadata can be include components in at least one embodiment in accordance with the techniques of the present disclosure. The example 800 includes UD logical address space 802, UD log 804, mapping information 806, UD log structure 808, MD log 810, translation table (TT) 812, and MD log structure 814. The UD log structure 808 can denote BE non-volatile storage, such as on BE PDs of the storage system, that persistently stores UD or content, for example, written by write operations. In at least one embodiment, the logs 804 and 810 can be persistently stored on a form of non-volatile storage such as on BE PDs. In at least one embodiment, the UD log structure 808 and the MD log structure 814 can have corresponding log structures as described elsewhere herein (e.g., such as in connection with FIGS. 2B-2D). In at least one embodiment consistent with other discussion herein, content persisted to each of the log structures 808, 814 can be written to consecutive sequential storage locations in an ongoing manner. In at least one embodiment, storage of 814 can be included a physical storage portion or tier sometimes referred to herein as the MD tier. In prior descriptions such as in connection with FIG. 6, the MD page store 540 can correspond to the MD tier.

As an example, assume a write W1 writes content C1 to a target logical address LA1 included in the UD logical address space 802. Consistent with other discussion herein in at least one embodiment, the write W1 can be recorded persistently in the UD log 804. At a later point in time, the recorded write W1 can be flushed from the UD log 804, where such flushing can include creating and/or updating one or more corresponding MD pages of the mapping information 806 used to map LA1 to a physical storage location PA1 included in a new physical storage location of a physical large block (PLB) of storage of the UD log structure 808. Updates made to a page of MD (e.g., MD top, mid, or leaf, or a VLB page) included in the mapping information 806 can be stored persistently in entries of the MD log 810. Consistent with discussion herein, such metadata updates stored in the MD log 810 can be made, for example, in connection with flushing the recorded write W1 from the UD log 804. Recorded metadata updates of the MD log 810 can also be flushed or destaged. As a result of the metadata updates to a page of MD M1 that are flushed from the MD log 810, an updated version of the metadata page M1 can be generated and stored at a new physical storage location PA2 on a PLB of the MD log structure 814. Additionally, corresponding information of the TT 812 can be updated to now map a logical address of M1 to its new storage location PA2.

As another example, assume a subsequent read R1 requests to read content C1 from the UD logical address LA1 (e.g., where LA1 can be included in the UD logical address space 802). In at least one embodiment, the existing mapping information 806 used to map LA1 to PA2 where C1 is stored can be used to service R1. Logical addresses of pages of metadata (including top, mid, leaf and VLB metadata pages of the mapping information 806) can be used and referenced. For example, a MD top page can reference MD mid pages using their corresponding logical addresses; a MD leaf page can reference addresses of VLB pages using their corresponding logical addresses; and the like. Put another way, pages of metadata of mapping information 806 can reference other pages of metadata in accordance with their logical addresses. The TT 812 can operate to translate a logical address of a MD page, such as the logical address L1 of MD page M1, to a corresponding physical address or location of the MD page, such as physical address PA1 of MD page M1, in the MD log structure 814.

In at least one embodiment, metadata pages can also be stored in volatile in-memory cache for faster access where the metadata page M1, if stored in the cache, can be accessed from the cache using M1's logical address L1. If M1 is not in cache when requested for reading such as when processing the read RI, a read cache miss results. Read cache miss processing in this example can include reading the MD page M1 from persistent storage, such as from its current physical storage location PA2 in the MD log structure 814.

To access a physical storage location of a metadata page in the MD log structure 814, the TT 812 can be used. In this manner in at least one embodiment read cache miss processing with respect to a metadata page that is not in cache, such as a volatile cache, can use the TT 812 to map the logical address L1 of the MD page M1 to its corresponding storage location PA2 in the MD log structure 814.

The element 812 can generally denote use of one or more TTs. In at least one embodiment as discussed in more detail elsewhere herein, two TTs can be represented by the element 812 including: a first TT, MD TT, used for mapping or translating top, mid, and leaf MD pages; and a second TT, VLB TT, used for mapping or translating VLB pages. Thus although examples herein for illustration purposes can include the foregoing two TTs, an embodiment can alternatively use a single TT, or more generally, any suitable number of TTs including the same information.

Figure 8:
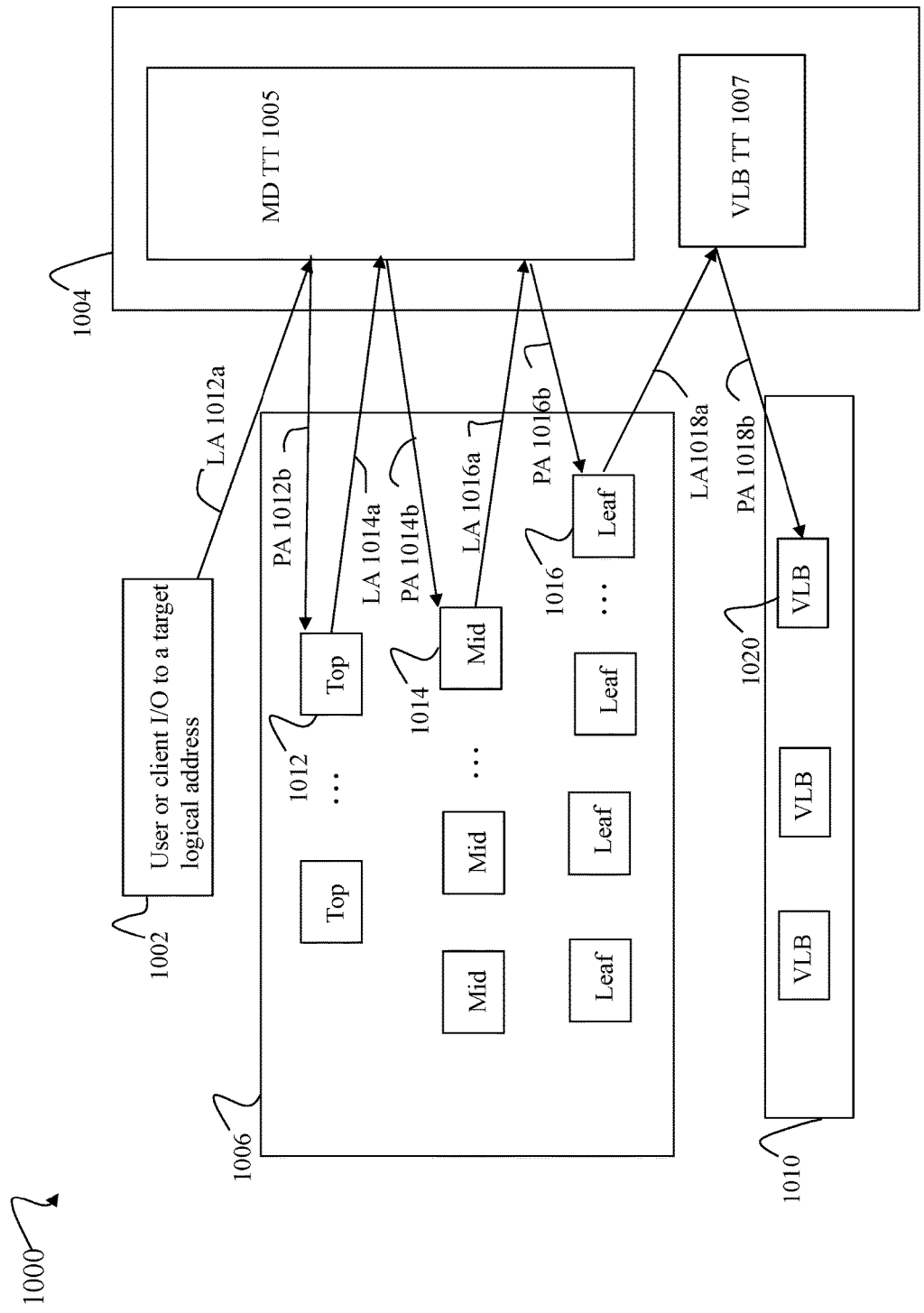
FIG. 8 is an example of illustrating logical to physical address translation of metadata pages included in a chain of mapping information.

Referring to FIG. 8, shown is an example 1000 illustrating further use of TTs in at least one embodiment in accordance with the techniques of the present disclosure.

In at least one embodiment, the elements 1004, 1006 and 1010 can denote different portions of non-volatile storage. The portion 1004 can persistently store the MD TT 1005 and the VLB TT 1007. The portion 1006 can persistently store top, mid and leaf MD pages. The portion 1010 can persistently store VLB pages. Element 1002 can denote a user or client I/O that includes a target logical address UD1 of the UD logical address space 802.

In at least one embodiment, TTs 1005, 1007 can include entries each mapping a logical address LA of a page of metadata to a corresponding physical address PA. To map an LA of a MD page to the corresponding PA where the MD page is persistently stored in the MD tier, processing can read the PA from a TT entry or element with the index LA, which can be represented as PA=TT [LA]. In at least one embodiment, the TTs 1005, 1007 can be structures maintained as set of MD pages of a new MD page type, such as a new type "TT".

In the example 1000, the element 1006 represents the non-volatile physical storage of the log structured system for persistently storing top, mid and leaf MD pages. The element 1010 represents a portion of the non-volatile storage used for persistently storing the VLB pages also considered metadata in at least one embodiment. The elements 1006 and 1010 can correspond to portions of the MD log structure 814 of example 800 and the MD page store 540 of FIG. 6 in at least one embodiment. Generally, the storage of 1004, 1006 and 1010 can be non-volatile storage, for example, of the MD tier that can include BE PDs of the storage system. The storage 1006 can be configured for storing a MD page to a new physical storage location each time the MD page is updated. The storage 1010 can be configured for storing a VLB page to a new physical storage location each time the VLB page is updated.

In at least one embodiment, the TTs 1005, 1007 can be accessed through cache (e.g., volatile memory) like other metadata pages. Consistent with discussion elsewhere herein in at least one embodiment, using the mapping information 806 of MD pages to map a user data or client target logical address to its corresponding physical location storing the content of the target logical address can require the mapping information of MD pages to be in cache. The mapping information can be characterized as forming a chain of MD pages including a top MD page, a mid MD page, a leaf MD page and a VLB page. A cached copy of a metadata page of the chain can be accessed in the cache based on its corresponding LA. If one of the MD pages of the mapping information is not stored in cache such as when servicing a read that reads the content from the target logical address, a cache miss results thereby triggering processing that loads the MD page from its current physical location on the non-volatile storage of 1006, 1010 into the cache for use in servicing the read. The TTs 1005, 1007 can be used to map a logical address or LA of a metadata page to its corresponding physical address or persistent storage location PA in connection with a cache miss of the MD page. The TTs 1005, 1007 can be cached in order to be used in connection with the foregoing mapping of LAs to corresponding PAs for metadata pages (e.g., top, mid, leaf and VLB pages) of the chain of mapping information.

For example, consider a read I/O 1002 to read data from a UD target logical address UD1. For the UD target logical address UD1, the logical address LA 1012a of the MD top page 1012 can be determined. If the MD top page 1012 is not in cache, cache miss processing can be performed where 1) the LA 1012a is then mapped by the MD TT 1005 to its corresponding physical address PA 1012b identifying the physical address or storage location of the MD top page 1012 in 1006; and then 2) the MD top page 1012 is loaded from its PA in 1006 into the cache and used to obtain the logical address LA 1014a of the next MD page, the mid MD page 1014, in the chain. Otherwise, if the MD top page 1012 is already in cache, the cached copy thereof can be used to obtain the LA 1014a of the next page, the mid MD page 1014, in the chain.

Processing can determine whether or not the mid MD page 1014 is in cache. If the mid MD page 1014 is not in cache, cache miss processing can be performed where 1) the LA 1014a is then mapped by the MD 1005 to its corresponding physical address PA 1014b identifying the physical address or storage location of the MD mid page 1014 in 1006; and then 2) the MD mid page 1014 is loaded from its PA in 1006 into the cache and used to obtain the LA 1016a of the next MD page, the MF leaf page 1016, in the chain. Otherwise if the MD mid page 1014 is already in cache, the cached copy thereof can be used to obtain the logical address LA 1016a of the MD leaf page 1016.

Processing can determine whether or not the MD leaf page 1016 is in cache. If the MD leaf page 1016 is not cache, cache miss processing can be performed where 1) the LA 1016a is then mapped by the MD TT 1005 to its corresponding physical address PA 1016b identifying the physical address or storage location of the MD leaf page 1016 in 1006; and then 2) the MD leaf page 1016 is loaded from its PA 1016b in 1006 into the cache and used to obtain the logical address LA 1018a to the VLB 1020 in the chain.

Processing can determine whether or not the VLB page 1020 is in cache. If the VLB page 1020 is not in cache, cache miss processing can be performed where 1) the LA 1018a is mapped by the VLB TT 1007 to its corresponding physical address PA 1018b identifying the physical address or storage location of the VLB page 1020; and then 2) the VLB page 1020 is loaded from its PA 1018b into cache and used to obtain the physical storage location where the requested content C1 for the target logical address UD1 is stored.

In connection with the foregoing, if a MD page of the mapping information chain is in the cache, the associated cache miss processing and thus associated TT mapping can be omitted. When a MD page, such as a top, mid or leaf MD page, is updated, the updated version of the page can be written to a new physical location, new PA, in the storage 1006. Additionally, when the MD page is updated and written to a new physical address PA, corresponding mapping information in the MD TT 1005 is also updated. In particular, the entry of the MD TT 1005 for the MD page is updated to now reference the new PA (e.g., MD TT 1005 is updated to map the MD page's fixed logical address to the new PA). When a VLB is updated, the updated version of the page can be written to a new physical location, new PA, in the storage 1010. Additionally, when the VLB page is updated and written to a new PA, corresponding mapping information in the VLB TT 1007 is also updated. In particular, the entry of the VLB TT 1007 for the VLB page is updated to now reference the new PA (e.g., the VLB TT 1007 is updated to map the VLB page's fixed logical address to the new PA).

Figure 9:
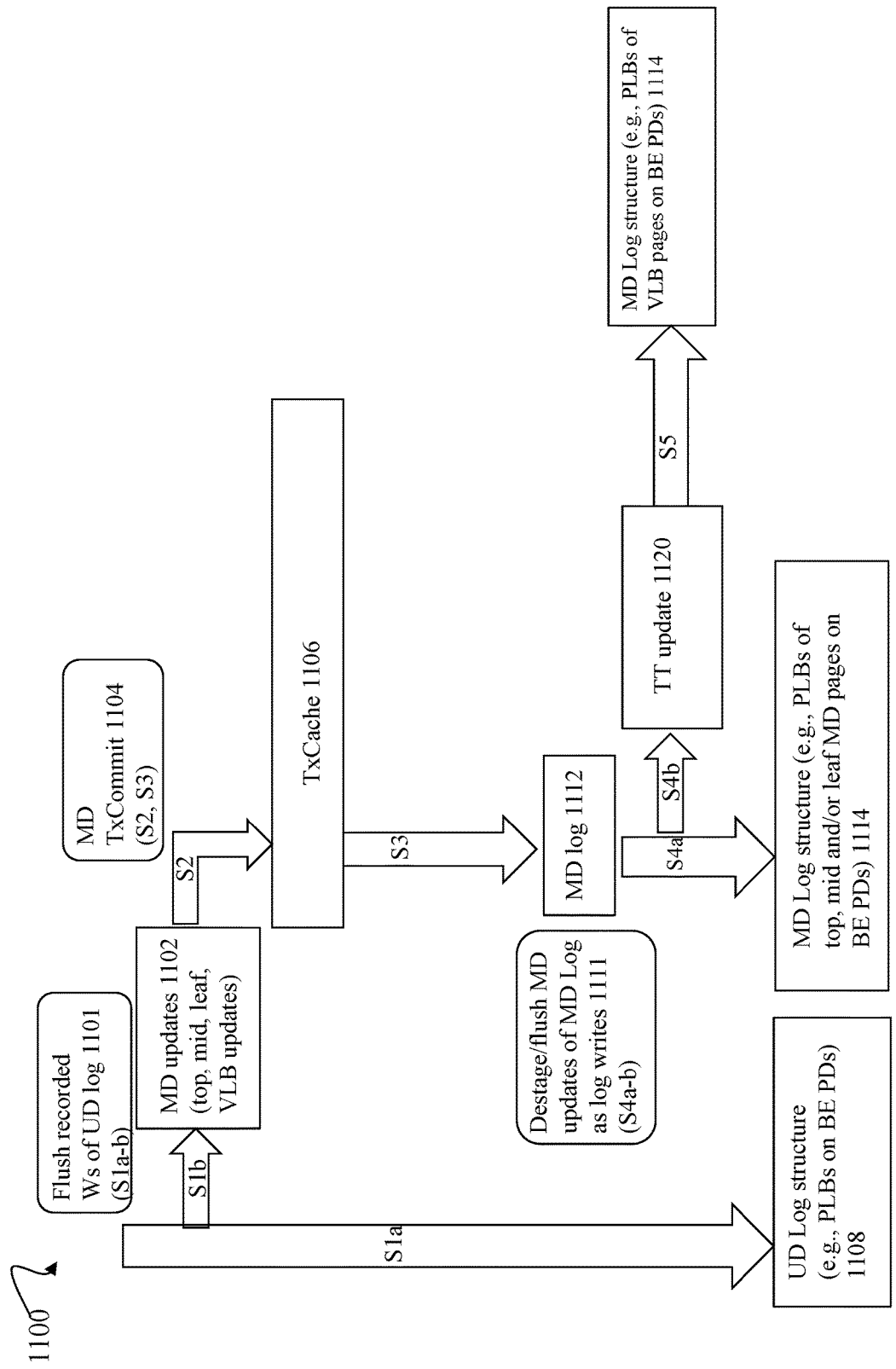

Referring to FIG. 9, shown is an example 1100 illustrating various processing or workflows in at least one embodiment in accordance with the techniques of the present disclosure.

The example 1100 includes a flush workflow or processing 1101 when flushing writes Ws as recorded in the UD log. Consistent with other discussion herein, flushing a recorded write W1 from the UD log (e.g., element 804 of the example 800), where W1 writes content C1 to UD logical address UD1, can include flows S1a-b. S1a can denote storing the written content C1 at a physical address of location PA1 in the UD log structure 1108 in a PLB of storage on the MD tier (e.g., stored on BE PDs). S1b can denote creating and/or updating one or more metadata pages of mapping information used to map UD1 to PA1, where PA1 currently includes the content C1 stored at UD1. Thus, S1b can include performing MD updates 1102 denoting top, mid, mid, leaf and/or VLB page updates. The MD updates 1102 (resulting from flushing the recorded write W1 from the UD log) can be included in a MD Tx (transaction) commit operation, workflow or processing 1104 where the MD updates 1102 to one or more pages are committed in the flow S2 to the Tx Cache 1106 and committed in the flow S3 to the MD log 1112. In at least one embodiment, the Tx Cache 1106 can denote a volatile memory cache. In at least one embodiment, the Tx Cache 1106 can include an in-memory or volatile memory copy of the MD log 1112, where the MD log 1112 can denote the persisted copy of the MD log stored on non-volatile storage.

In a manner similar to flushing entries of the UD log, recorded MD updates included in entries of the MD log 1112 (and also the in-memory copy in Tx Cache 1106) can be destaged or flushed as represented by element 1111. Destaging or flushing MD updates of the MD log as log writes 1111 can result in performing processing denoted by the flows S4a-b. S4a can denote applying one or more MD updates to a MD page to generate an updated version of the MD page, where the updated version of the MD page can be stored persistently at a new physical storage location of the MD log structure (MD LSS) 1114. S4b can denote a TT update 1120 that needs to be made to a TT, where the TT update 1120 is in accordance with the new physical storage location. In particular in at least one embodiment, the TT update 1120 can include updating the TT to map the existing logical address of the updated MD page to the new physical storage location. In at least one embodiment, there can be a corresponding unique entry in the TT for each top, mid, leaf and VLB page of metadata such that each MD page updated results in updating the MD page's corresponding mapping entry of the TT with the MD page's new physical storage location or address.

One or more TT updates 1120 can be included in a TT Tx Commit operation, workflow or processing, where the TT updates can be committed in the flow S5 to the persisted TT as stored in the MD log structure (MD LSS) 1114 on BE non-volatile storage. Additionally, the one or more TT updates 1120 can also be applied to an in-memory or volatile memory copy of the TT such as can be included in a cache. In at least one embodiment, the persisted TT can be stored in a first separate portion of BE non-volatile storage, the VLB pages can be stored in a second portion of BE non-volatile storage, and the top, mid and leaf MD pages can be stored in a third separate portion of BE non-volatile storage.

As described elsewhere herein, for example, such as in connection with FIGS. 3, 4, and 5, a first MD page, such as a MD MID page, can include multiple entries where each such entry can include a pointer, address, reference, offset, or index to a MD leaf page. In at least one implementation not in accordance with the techniques of the present disclosure, the foregoing pointer or address of a MD MID page entry can directly reference the MD leaf page, where the pointer or address can be the physical address or location of the MD leaf page as stored on BE non-volatile storage. Thus, if the referenced MD leaf page is stored in a new physical location such as in connection with an LSS, the entry of the MD MID page must be updated also to include the new physical location or address.

In contrast to the foregoing in at least one embodiment in accordance with the techniques of the present disclosure, the entry of the MD MID page can generally include a logical address LA of a MD leaf page that is mapped or translated by the MD TT 1105 to the physical storage location or address PA of the MD leaf page as stored in a PLB of the MD log structure of the MD tier. More generally in at least one embodiment in accordance with the techniques of the present disclosure, MD page entries can reference other MD and VLB pages by their logical addresses rather than physical addresses. For example, a MD MID page entry can reference a MD leaf page using the MD leaf page's logical address that can then be mapped or translated, such as using a MD TT, to the physical address of the MD leaf page.

When updates to a MD page are flushed from the MD log, such updates can be applied to a current version V1 of the MD page as persistently stored in the MD log structure to generate an updated version V2 of the MD page. In accordance with an LSS, the updated version V2 of the MD page can then be persistently stored as the most recent copy of the MD page of the MD log structure, where the updated version V2 of the MD page can be stored at a new physical storage location or address that is different from the existing physical storage location or address of V1 of the MD page. Thus, as a MD page is updated and then persistently stored as part of flushing or destaging the MD log, the physical storage location or address of the MD page will change and the changed physical storage location or address can be noted in the appropriate TT, such as the MD TT for top, mid and leaf MD pages and similarly in the VLB TT for VLB pages. In at least one embodiment, the logical addresses of the MD pages and the VLB pages can remain the same even though the physical storage locations or addresses of such MD pages as stored in the MD LSS can change.

In at least one embodiment, at least some of the entries of the MD TT and VLB TT can be stored in memory such as volatile cache memory. Consistent with other discussion herein, version V1 of a MD page leaf1 can be stored on the BE non-volatile storage at a physical or address or location PAL. Subsequently, flushing updates from the MD log that update MD page leaf1 from version V1 to version V2 result in storing MD page leaf1 V2 at a new current physical address or location PA3, and also trigger a corresponding update U12 to the MD TT. U12 can identify, for example, the update or change to the TT entry corresponding to MD page leaf1 to identify PA3 (rather than PA1) as the current physical storage location or address for MD page leaf1.

Figure 10:
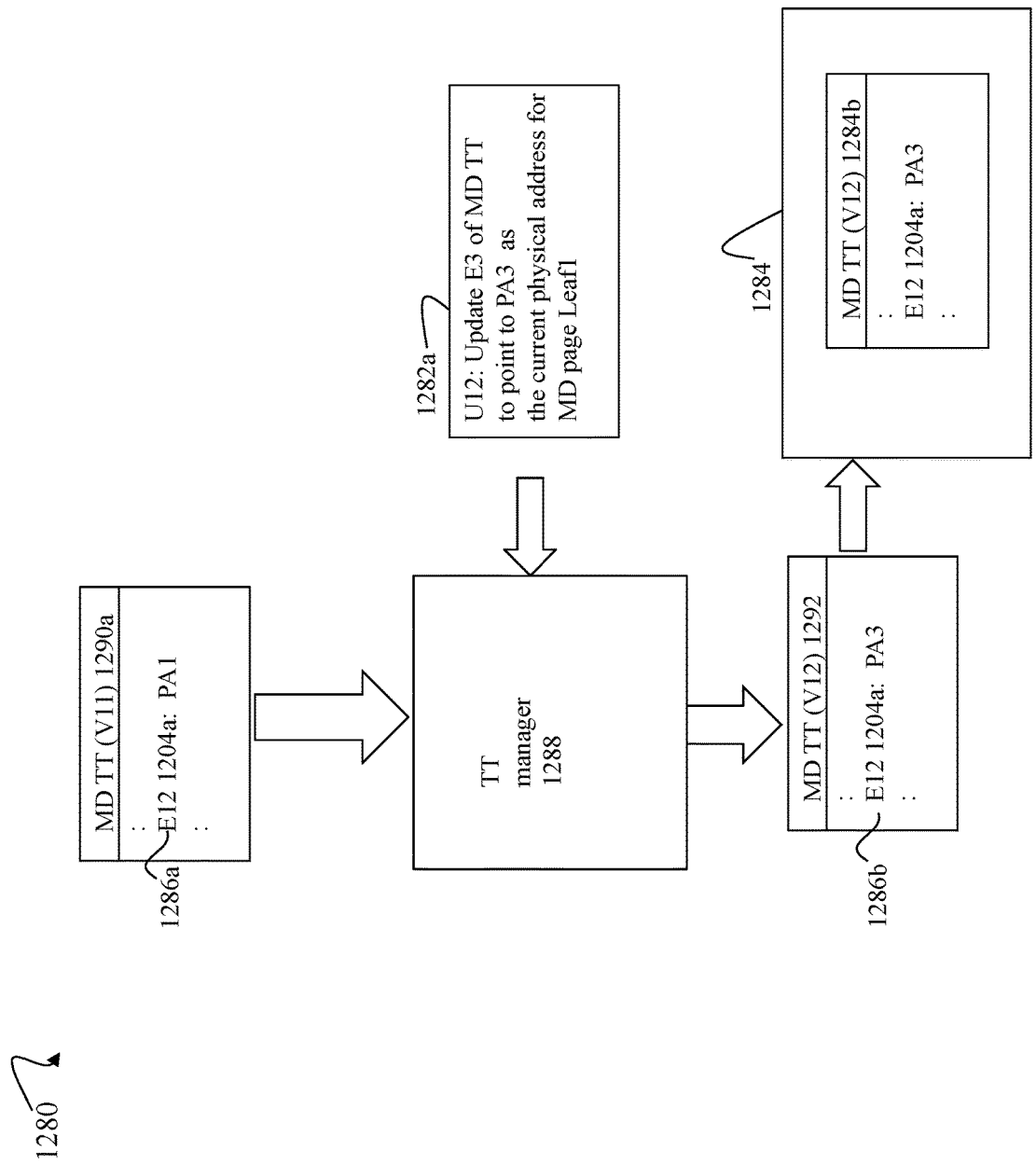

Referring to FIG. 10, shown is an example 1280 illustrating in further detail the foregoing update U12 for the MD TT in at least one embodiment.

As illustrated in the example 1280 of FIG. 10, there can be an update U12 for the entry E12 1204a identifying PA3 as the current physical address or location of current version of the MD page Leaf1. In at least one embodiment U12 can be applied to the persistent copy of the MD TT as well as a cached copy of the MD TT.

To further illustrate the foregoing, reference is made to the example 1280 that includes element 1290a representing the persistently stored copy MD TT. In at least one embodiment, management of the persisted versions of the TTs, including the VLB TT and the MD TT, can be performed by a TT manager component 1288. The TT manager 1288 can apply updates to the persisted copies of the VLB TT and MD TT to generate updated versions of the VLB TT and MD TT with updated corresponding entries thereof. The example 1280 illustrates application of MD TT updates but similar processing can be performed in connection with application of VLB TT updates.

The TT manager 1288 can receive inputs including the most recently persisted version of the MD TT, MD TT V11 1290a, and TT update U12 1282a. The TT manager can apply the update U12 1282a to the entry E12 1204a of the MD TT (V11) 1290a to generate an updated MD TT (V12) 1292. In this example, V11 of the entry E12 1286a of 1290a is updated to V12 of the entry E12 1286b of 1292. In particular, the MD TT (V12) 1292 can correspond to the in-memory or cached MD TT. The MD TT (V12) 1292 can also be persistently stored in the MD tier 1284 on BE non-volatile storage. Element 1284b can denote the persistently stored MD TT after also applying the updated U12 1282a to the persisted MD TT.

In a similar manner, updates can also be applied to cached and persisted copies of the VLB TT.

Figure 11A:
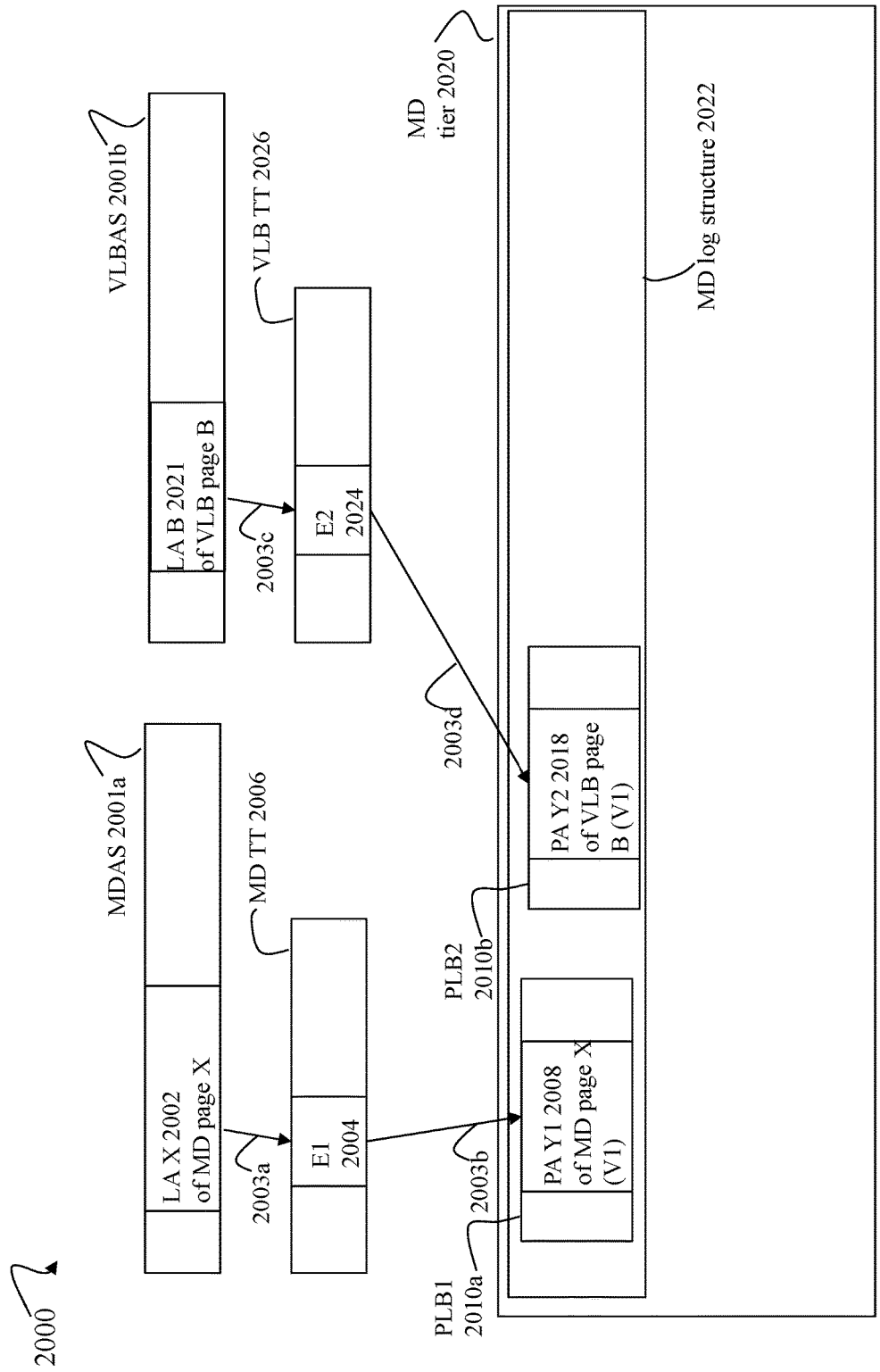
Figure 11B:
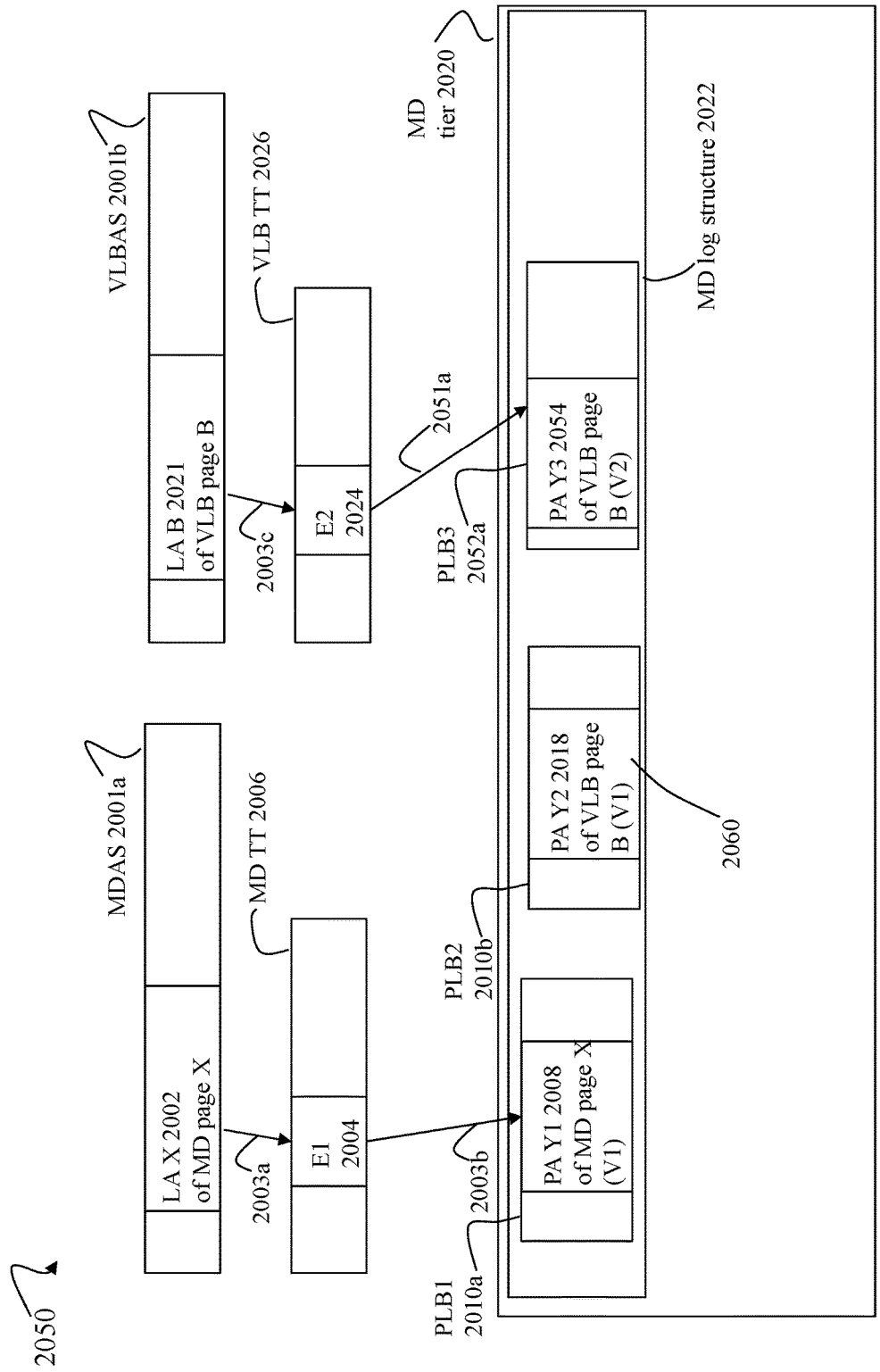

Referring to FIGS. 11A and 11B, shown are examples illustrating in more detail use of the MD TT and VLB TT in at least one embodiment in accordance with the techniques of the present disclosure.

FIG. 11A is an example 2000 that illustrates the state of structures and storage of the system at a first point in time T1; and FIG. 11B is an example 2050 that illustrates the state of the structures and storage of the system at a second point in time T2 subsequent to T1.

With reference to FIG. 11A, the example 2000 includes MDAS (MD logical address space) 2001a, MD TT 2006, VLBAS (VLB logical address space) 2001b and VLB TT 2026. Elements 2001a-b denote the logical address spaces that are mapped, respectively, by the TTs 2006, 2026, to corresponding physical storage addresses or locations in the MD log structures 2022 of the MD tier 2020.

Consistent with other discussion herein, the TTs 2006, 2026 can be characterized as providing a layer of indirection between logical addresses, respectively, of 2001a-b and corresponding physical addresses or locations stored in the MD log structure 2022 of the MD tier 2020.

In the example 2000, the MDAS 2001a can include logical address LA X 2002 of MD page X that is mapped (2003a) to a corresponding entry E1 2004 of MD TT 2006 that is further mapped (2003b) to a corresponding current physical address or location PA Y1 2008 currently storing V1 of MD page X. PA Y1 2008 can be included in PLB 2010a of the MD log structure 2022.

In the example 2000, the VLBAS 2001b can include logical address LA B 2021 of VLB page B that is mapped (2003c) to a corresponding entry E2 2024 of VLB TT 2026 that is further mapped (2003d) to a corresponding current physical address or location PA Y2 2018 currently storing V1 of VLB page B. PA Y2 2018 can be included in PLB 2010b of the MD log structure (e.g., MD LSS) 2022.

In at least one embodiment, the TTs 2006, 2026 can denote the in-memory current version of the TTs at time T1.

At the second point in time T2 subsequent to T1, updates to VLB page B can be flushed from the MD log and applied to the current persistently stored version V1 of VLB page B as stored at PA Y2 2018 of PLB 2 2010b to generate an updated version, VLB page B V2. As illustrated in the example 2050 of FIG. 11B, the VLB page B V2 can be stored at a new physical address or location PA Y3 2054 of the PLB3 2052a of the MD log structure 2022. Accordingly, the entry E2 2024 of the VLB TT 2026 can be updated to now point or reference (2051a) the new physical address or location PA Y3 2054 (rather than point to or reference PA Y2 2018).

Systems can include various structures stored in a cache such as a fast volatile memory, where such structures can sometimes also referred to herein as in-memory or volatile memory structures. As discussed herein, a TT or translation table can be used to perform address translations of logical to physical addresses or locations for various metadata pages in a log structured system or LSS. In this context in at least one embodiment, metadata (MD) pages can generally include top, mid and leaf MD pages as well as VLB pages discussed above. A TT can be used to translate a logical address of a MD page to a corresponding physical address or location where the MD page is stored on BE non-volatile storage. As discussed above, an embodiment can generally include one or more TTs that map metadata page logical addresses to corresponding current physical storage locations or addresses where the metadata pages are stored. In at least one embodiment, the general class of MD pages can include top, mid and leaf MD pages and VLB pages. In at least one embodiment, a first TT (e.g., VLB TT) can be used to map logical addresses of top, mid and leaf MD pages to corresponding physical addresses, and a separate second TT (e.g., MD TT) can be used to map logical addresses of VLB pages to corresponding physical addresses. As a variation, an embodiment can use a single TT for mapping logical to physical addresses of all such MD pages including top, mid and leaf MD pages and VLB pages.

To provide fast access to recently read or modified TT entries, a TT cache (sometimes referred to as a TT address cache) can be used. The TT cache can be an in-memory copy of at least some of the TT entries of the TT. The TT cache can include in-memory copies of at least some of the TT entries expected to be used again and/or recently use. The TT cache can be indexed by MD page logical addresses that are mapped to corresponding physical addresses or locations on BE non-volatile storage where the respective MD pages are stored. In at least one embodiment, each node can include a node-local TT cache that is a volatile memory cache where the TT cache includes a copy of at least some of the entries of the TT.

Updates, changes or deltas to a MD page can be stored in a MD log in at least one embodiment. The changes to a MD page can be subsequently destaged from the MD log and applied to a current version of the MD page to generate a new version of the MD page. In at least one embodiment where the metadata is managed and stored in accordance with an LSS, the current version of the MD page is stored at a first physical location or address on BE non-volatile storage, and the new version of the MD page is written to a new physical location or address different than the first physical location or address of the prior version. Thus each time updates are applied to a MD page as part of destaging the MD log such that a new version of the MD page is generated and stored at a new physical location or address, the MD page's corresponding TT entry in the TT can also be updated. In at least one embodiment, the corresponding TT entry as stored in a persisted TT on BE non-volatile storage can be updated. Also when a TT entry is updated, any cached copy of the existing TT entry in the TT cache becomes invalid or stale. If the TT cache includes an existing TT entry for the MD page, the cached existing TT entry indicates that the MD page is stored at the first physical location or address of the prior version of the MD page (e.g., before applying the update). After the new revised version of the MD page is stored at a different location, the new physical address or location, thereby invalidating the information of any cached existing TT entry for the MD page, where the existing cached TT entry incorrectly indicates the prior physical address of the MD page as the current physical address rather than indicate the new physical address or location as the current physical address. As a result in at least one embodiment, the corresponding TT entry of the TT cache can be removed or invalidated. Alternatively, the corresponding TT entry of the TT cache can be updated to properly map the MD page logical address to the current new physical address or location of the MD page.

In at least one embodiment, the one or more TTs, metadata pages (including VLB pages and top, mid and leaf MD pages), and user data pages can be stored persistently on BE non-volatile storage. In at least one embodiment, the one or more TTs can be persistently stored in a first portion of BE non-volatile storage; the metadata pages (including VLB pages and top, mid and leaf MD pages) can be persistently stored in a second portion of BE non-volatile storage; and the user data pages can be persistently stored in other portions of BE non-volatile storage. Within the MD tier in at least one embodiment, pages of different types or categories can be stored in segregated storage areas. In at least one embodiment, a first category or type of metadata pages can include VLB pages, and a second category or type of metadata pages can include top, mid and leaf MD pages. VLB pages can be stored in a first storage area of the MD tier, where the first storage area can sometimes be referred to herein as a VLB storage area. In at least one embodiment, top, mid and leaf MD pages can be stored in a second storage area of the MD tier, where the second storage area can sometimes be referred to herein as a non-VLB or MD storage area. In at least one embodiment, groups of pages can be persistently stored in large chunks, portions or storage units such as PLBs discussed elsewhere herein. In at least one embodiment, each PLB can be 2 MB in size, and each page can be 4 KB in size such that a PLB can store 512 pages. In at least one embodiment, content can be written to BE non-volatile storage as a single PLB. In at least one embodiment, the size of a single PLB can be the size of a single stripe of storage across multiple storage devices of BE non-volatile storage.

Consistent with other discussion herein in at least one embodiment, the MD log can be flushed or destaged, where the MD log can include records or entries of updates to MD pages. In at least one embodiment, the MD pages can include top, mid and leaf MD pages and VLB pages such as included in the mapping information and hierarchical structure such as discussed above (e.g., in connection with FIGS. 2D, 3, 4, 5, and 6). In at least one embodiment, flushing or destaging entries from the MD log can include aggregating multiple updates made to the same metadata page; obtaining an existing persisted copy of the metadata page from a first storage location on BE non-volatile storage; generating an updated metadata page by applying the multiple updates to the existing copy of the metadata page (as read from BE non-volatile storage); and writing out or storing the updated metadata page at a second storage location on BE non-volatile storage. In at least one embodiment where the metadata is managed as an LSS, the foregoing first and second storage locations can be different physical storage locations on BE non-volatile storage.

In at least one embodiment, writing out or destaging the updated metadata page, generated as a result of flushing and applying corresponding updates from the MD log, can include storing the updated metadata page to a persistent buffer or staging area in order to accumulate a sufficient number of updated metadata pages to perform a large sequential write to the BE non-volatile storage. In at least one embodiment, the staging area can generally include multiple regions, where each region can be the size of a single PLB. When a single region of the staging area is full, or otherwise sufficiently full (e.g., within a specified tolerance) in at least one embodiment, the single region of updated MD pages can be written out or persistently stored on BE non-volatile storage (e.g., such as to the MD tier).

What will now be described are further details regarding the persistent staging area and its use in at least one embodiment in accordance with the techniques of the present disclosure.

Referring to FIG. 12A, shown is an example 1300 illustrating the staging area in at least one embodiment in accordance with the techniques of the present disclosure. The staging area can be used to temporarily hold updated metadata pages generated as a result of applying flushed updates from the MD log to corresponding pages. In this manner in at least one embodiment, the staging area can be used in connection with storing updated metadata pages generated as a result of applying corresponding updates flushed or destaged from the MD log.

FIG. 12A represents one arrangement, layout or configuration of the staging area in at least one embodiment where the storage system or appliance includes two processing nodes that flush or destage updates from the MD log and generate updated MD pages that the respective nodes store in the staging area. The two nodes of the system can be referred to as node A and node B in the following discussion.

In at least one embodiment, the staging area can be a fixed set of persistent or non-volatile storage areas or partitions that supports random writes with a write granularity size of a single metadata page. For example in at least one embodiment, each updated or dirty metadata page written to the staging area can be 4 KB in size such that the staging area can support random 4 KB writes. In at least one embodiment, the persistent non-volatile storage or memory used for the staging area can also be characterized as high-availability protected and/or fault tolerant. In at least one embodiment, both nodes A and B can read content from, and write content to, the staging area. In at least one embodiment, the staging area can be software defined persistent or persisted memory (SDPM).

In the example 1300, the staging area can include 4 partitions 1301, 1302, 1303 and 1304 used to stage and accumulate regions of updated metadata pages. Generally, the number of partitions of the staging area can be based, at least in part, on the number of nodes and the number of types, classifications or categories of metadata allowed to be stored in the staging area. As noted above in at least one embodiment, there can be 2 nodes (A and B) in the storage system. Additionally in at least one embodiment, there can be two types, classifications or categories of metadata that can be written to the staging area: a first type of "VLB" including only VLB pages, and a second type of "MD" including only top, mid and leaf MD pages.

Each partition can be owned exclusively by a single node where the partition owner of a partition is the particular node that further destages or writes out the content of the partition to BE non-volatile storage. Each partition can store a single one of the types, classifications or categories of metadata. Thus in at least one embodiment with 2 nodes (e.g., node A and node B) and 2 types of metadata (e.g., MD and VLB), there can be 4 partitions, where 2 of the partitions are owned exclusively by node A and where the remaining 2 partitions are owned by node B. Additionally, each of the 2 partitions owned by each node can store content or metadata of only a single one of the 2 types. In the example 1300, node A can be the partition owner of partitions 1301, 1302, where partition 1301 stores MD type pages including top, mid and leaf MD pages and where partition 1302 stores VLB type pages; and node B can be the partition owner of partitions 1303, 1304, where partition 1302 stores MD type pages including top, mid and leaf MD pages and where partition 1304 stores VLB type pages.

In at least one embodiment, the concept of ownership or assignment can also be used in connection with metadata pages, including VLB pages and top, mid and leaf MD pages. Each metadata page can be assigned to a particular one of the nodes whereby the assigned node can be identified as the metadata page owner. Each partition owned by a particular node can be used for storing updated pages also owned by the particular node. In at least one embodiment, partition ownership of a partition identifies the particular node that writes or destages content from the partition (more generally staging area) to BE non-volatile storage; metadata page ownership of a metadata page identifies the particular node that destages the metadata page from the staging area to BE non-volatile storage. Accordingly in at least one embodiment, updated metadata pages owned by a particular node can be stored in a respective partition owned by the particular node.

In the example 1300, each partition can have associated properties or attributes including the partition's respective partition owner and metadata type.

In the example 1300, partition 1301 can include a partition owner attribute 1301a denoting node A as the partition owner; and can include a page type or metadata type attribute 1301b identifying the MD type pages including top, mid and leaf MD pages. In at least one embodiment, the partition 1301 can be a MD partition for staging top, mid and leaf MD pages owned by node A. Node A as the partition owner of partition 1301 destages or writes out content (e.g., updated pages) from the partition 1301 to BE non-volatile storage (e.g., MD tier).

In the example 1300, partition 1302 can include a partition owner attribute 1302a denoting node A as the partition owner; and can include a page type or metadata type attribute 1302b identifying the VLB type page. In at least one embodiment, the partition 1302 can be a VLB partition for staging top, mid and leaf MD pages owned by node A. Node A as the partition owner of partition 1302 destages or writes out content (e.g., updated pages) from the partition 1302 to BE non-volatile storage (e.g., MD tier).

In the example 1300, partition 1303 can include a partition owner attribute 1303a denoting node B as the partition owner; and can include a page type or metadata type attribute 1301b identifying the MD type pages including top, mid and leaf MD pages. In at least one embodiment, the partition 1303 can be a MD partition for staging top, mid and leaf MD pages owned by node B. Node B as the partition owner of partition 1303 destages or writes out content (e.g., updated pages) from the partition 1303 to BE non-volatile storage (e.g., MD tier).

In the example 1300, partition 1304 can include a partition owner attribute 1304a denoting node B as the partition owner; and can include a page type or metadata type attribute 1304b identifying the VLB type page. In at least one embodiment, the partition 1304 can be a VLB partition for staging top, mid and leaf MD pages owned by node B. Node B as the partition owner of partition 1304 destages or writes out content (e.g., updated pages) from the partition 1304 to BE non-volatile storage (e.g., MD tier).

Figure 12B:
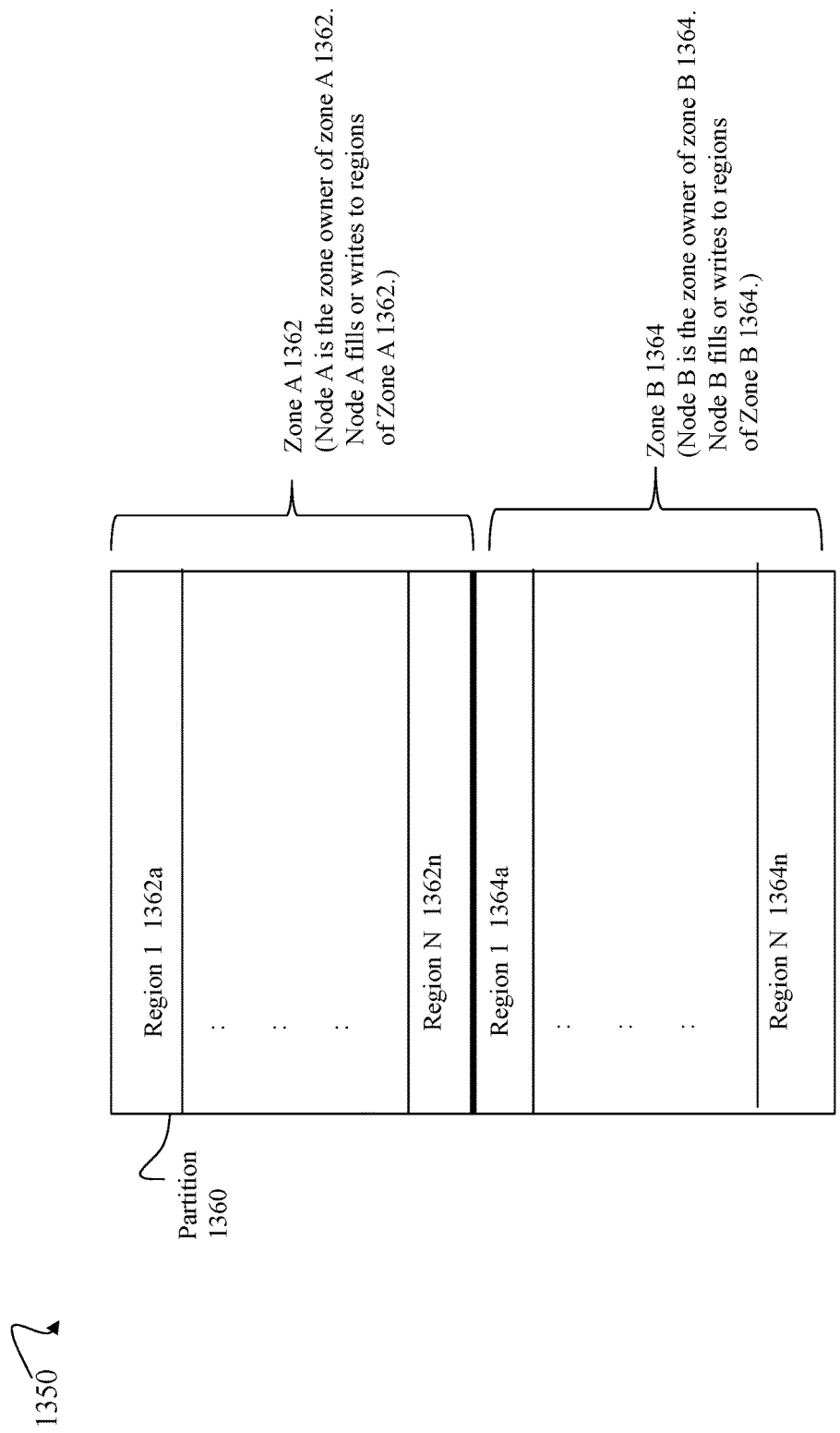

Referring to FIG. 12B, shown is an example 1350 illustrating further detail regarding an arrangement, layout or configuration of a single partition in at least one embodiment in accordance with the techniques of the present disclosure. Each partition of the staging area can have the arrangement, layout or configuration of FIG. 12B even though only a single partition is illustrated in FIG. 12B for simplicity.

Each partition 1360 can include two zones, 1362, 1364, where each of the zones 1362, 1364 can be assigned to or associated with a respective one of the nodes. In the example 1350, the partition 1360 can include: zone A 1362 where node A is the assigned zone owner of the zone 1362; and zone B 1364 where node is the assigned zone owner of the zone 1364. The zone owner of a particular zone is the single node that fills, writes or stages content (e.g., updated MD pages) to the particular zone. In the example 1350, node A is the zone owner of zone A 1362 such that node A fills, writes or stages content to the zone A 1362; and node B is the zone owner of zone B 1364 such that node B fills, writes or stages content to the zone B 1364. In this manner, while the partition owner of the partition 1360 can be responsible for destaging, storing or writing out the content of the partition to the MD tier of BE non-volatile storage, both nodes A and B can stage or write content (e.g., updated metadata pages) in the partition 1360 in each node's assigned zone. A zone owner of a zone can be the node allowed to exclusively stage content in the zone. In this manner, the zone owner can write content to its assigned zone independently and without contention from the peer node that may be writing content to its respective assigned zone. In at least one embodiment, both nodes can be allowed to update any of the metadata pages (e.g., any of the VLB pages and any of the top, mid and leaf MD pages) such that the node generating the updated metadata page can stage the updated metadata page in a zone owned by the node (e.g., zone owner of a zone is the node writing or staging the updated metadata page in the zone of the staging area).

Each zone can be further divided into multiple regions, where each region can accumulate a set of pages prior to destaging the entire set of pages to the MD tier of BE non-volatile storage. Thus in at least one embodiment, a single region can include the set of pages destaged, stored or written out to the MD tier in a large sequential write. In the example 1350, the zone A 1362 can include regions 1-N 1362a-n; and the zone B 1364 can include regions1-N 1364a-n. In at least one embodiment, each of the regions 1362a-n and 1364a-n can be the size of a single PLB of non-volatile storage in the MD tier. In this manner, the set of pages of the same metadata type or classification can be accumulated and written out together in the same PLB of BE non-volatile storage (e.g., MD tier).

In at least one embodiment, a zone owner can fill regions of the zone sequentially, and can also fill each single region sequentially. However since a partition owner can generally destage full regions in any order, it may be that a next sequential region is not available for staging new content. In such scenarios in at least one embodiment, the zone owner can simply continue to search for the next region available for storing new content.

In summary in at least one embodiment, storage of the staging area can have the following characteristics, properties or attributes:

The staging area includes 4 partitions each having an assigned partition owner, where the partition owner is the node that exclusively destages, stores or writes content of the partition out to the MD tier.

Each partition has an associated metadata type or classification denoting the type of metadata pages allowed to be stored in the partition.

Each partition is used to store only metadata pages owned by the partition owner.

Each partition includes two zones, one per node, where each zone is assigned a single node as the zone owner, where the zone owner is the single node that writes, fills or stages content to the zone.

Each zone is divided into multiple regions. Each region denotes a set of pages of a particular metadata type or classification to be destaged or written out to the MD tier in a single write operation. For a region R1 included in a partition P1, pages in the region R1 have an associated metadata type or classification where the pages of R1 are owned by a particular node that is the partition owner of P1.

Consistent with discussion above, each of metadata pages that can be stored in the staging area can be assigned to a particular one of the nodes, where the assigned node can be designated as the page owner or metadata page owner. In at least one embodiment where the allowed staging area metadata page types include MD pages (denoting top, mid and leaf MD pages) and VLB pages, each metadata page can be assigned to one of the nodes based, at least in part, on the page's address, such as the page's logical address. For example in at least one embodiment, metadata pages with odd logical addresses can be assigned to one of the nodes, such as node A, and the remaining metadata pages with even logical addresses can be assigned to the remaining second node, such as node B. More generally, an embodiment can use any suitable technique to assign ownership of the metadata pages among the nodes A and B in the storage system.

The concept of page ownership or metadata page ownership of a particular page P11 describes the node that is responsible for destaging, writing out or storing the page P11 from the staging area to the MD tier. In at least one embodiment, any of the metadata pages (e.g., top, mid and leaf MD pages and VLB pages) allowed to be staged to the staging area can be 1) modified by any node and 2) written to the staging area by any node (e.g., into the particular zones assigned to the respective nodes). To further illustrate with reference to FIGS. 12A and 12B, assume that VLB page V1 is owned by node A. Node B can generate updated VLB page V1 and can store the updated VLB page V1 in the appropriate partition matching the properties or attributes of: partition owner=node A and page type or metadata page type=VLB. In this example, the appropriate partition is partition 2 1302 that is owned by node A and stores VLB pages. Within the partition 1302, there can be two zones, such as zone A 1362 and zone B 1364. The updated VLB page V1 is stored or staged by node B in the particular zone B 1364 of the partition 1302, where the node B is the zone owner of zone B (e.g., where the zone owner is allowed to write to or stage content to the zone). Thus an updated metadata page V1, that is owned by a node ND1, can be staged in the partition P1, also owned by the node ND1. Put another way, each updated metadata page can be staged in a partition P1 such that the designated partition owner matches the designated metadata page owner. The particular node ND2 staging the updated metadata page V1 to the staging area stores V1 in a particular zone of the partition P1, where ND2 is the zone owner allowed to write content to the particular zone.

In at least one embodiment, an updated metadata page P11 can be stored, staged or written to a particular zone Z1 of a particular partition P1 of the staging area by a node ND2 based on: the particular node ND1 assigned as the page owner of page P11 and the particular node ND2 staging P11. In particular, the ND2 is the owner or zone owner of zone Z1 and the node ND1 is the partition owner of partition P1. It should be noted that ND1 and ND2 can denote different nodes in processing scenarios where the node staging the page P11 to the staging area is different than the node that owns page P11 and partition P1. It should be noted that ND1 and ND2 can denote the same node in processing scenarios where the node, that is staging the page P11 to the staging area, is also the node that owns page P11 and partition P1.

In at least one embodiment, each transaction (e.g., each MD transaction) can include committing one or more updates to one or more metadata pages resulting in generating one or more corresponding updated metadata pages. Workflow processing associated with updates of such a transaction can include destaging the updated metadata pages from the staging area to the MD tier of BE non-volatile storage. In at least one embodiment, each transaction can be associated with a unique generation number. In at least one embodiment, one or more metadata pages updated by updates of a particular transaction can be encoded or marked with the unique generation number of the particular transaction. In at least one embodiment, generation numbers can be assigned from a monotonically increasing integer sequence. Each transaction can be assigned a next unique generation number from the monotonically increasing integer sequence. In this manner, the generation number of a metadata page can be used to determine the most recent version of a metadata page. For example, the generation number of a metadata page can be used to determine the most recent version of a metadata page that is staged in the staging area multiple times prior to being destaged, copied or written out to the MD tier. In at least one embodiment, the generation number can be characterized as, and sometimes referred to as, a global sequence number or GSN that can be uniquely used to identify the particular transaction across the storage system. Generally, an embodiment can use any suitable technique to generate generation numbers or GSNs uniquely identifying corresponding transactions, where such generation number or GSNs denote a sequence of monotonically increasing integers. In this manner, the larger or higher the generation number or GSN, the more recent the transaction, and thus the more recent the particular metadata page version. For example, there may be a first version V1 and a second version V2 of the same metadata page P11, where V1 has a first generation number or GSN1 and where V2 has a second generation number or GSN2. If GSN1<GSN2, then V2 is the more recent or current version of the page P11, and otherwise V1 is the more recent or current version of the page P11.

In at least one embodiment, updated metadata pages can be written to the staging area as part of a staging workflow. In at least one embodiment, the staging workflow can be included in a more general overall workflow of flushing or destaging updates from the MD log that includes persistently storing or writing updated MD pages to the MD tier of BE non-volatile storage, where the MD tier is managed and organized as an LSS. As such, as each updated page is written to the MD tier, it is stored at a new physical storage location different from an existing location storing a prior version of the page. Consistent with other discussion herein in at least one embodiment, staging can occur when updates are made to one or more metadata pages such as in connection with flushing or destaging the MD log, or as part of a bulk update operation. In at least one embodiment, bulk updates that are included in a bulk update operation can also be performed in connection with the MD log. With bulk updates, updates to one or more pages of metadata can be collected and then committed in a single transaction. The committed bulk updates of the single transaction can be recorded in the MD log and can be further processed as discussed herein (e.g., flushed or destaged from the MD log).

In at least one embodiment, the staging workflow with respect to a single updated metadata page G1 can include determining the type or classification of the metadata page G1 and which node is the page owner of G1. A particular partition P12 of the staging area can be selected based on metadata page Gi's metadata type or classification and the particular node that owns G1. In at least one embodiment, the staging workflow can include determining the particular zone Z1 of the selected partition P12 based on the node staging or writing the page G1 to the staging area (e.g., or more generally writing the page G1 to the MD tier of BE non-volatile storage). G1 can be written or staged to a physical location or address LOC1 of region R1 of the zone Z1. R1 can be a region of Z1 currently allowed to be filled (e.g., region that is fillable or filling). In at least one embodiment, the staging workflow can include updating the TT to map the logical address LA1 of the metadata page G1 to its current physical address or location LOC1 in the staging area. In at least one embodiment, updating the TT can include updating all instances of the TT as may be stored in cache or volatile memory on each node as well as the persisted TT on BE non-volatile storage. In such an embodiment, once the one or more updated metadata pages of the transaction have been staged to their respective regions in their respective zones in the staging area, the TTs can be accordingly updated to map the logical addresses of the metadata pages to their respective physical addresses or locations in the staging area. Therefore in at least one such embodiment, while logical addresses of metadata pages are mapped by the TT to their respective locations in the staging area, a metadata read cache miss is directed to the staging area to retrieve or read the current version of the metadata page.

In at least one embodiment, a single staging operation for a single transaction of multiple updated metadata pages can populate several different respective regions of the staging area. Each region into which an updated metadata page is staged can be included in a particular zone of a particular partition. In at least one embodiment, the particular zone and particular partition can be determined and selected based on characteristics, properties or attributes of the zones, partitions, and metadata pages. Consistent with other discussion herein in at least one embodiment, the zone Z1 and partition P12 selected for staging an updated metadata page G1 can be based, at least in part, on the following rules or criteria:

1) a match between the metadata type Y1 of page G1 and the metadata type Y1 of the selected partition P12;
2) a match between the node O1 that owns page G1 and the node O1 that owns the selected partition P12; and
3) a match between the node O2 that is writing or staging the page G1 and the node O2 that owns the selected zone Z1;

where the foregoing 3 rules or criteria must be met or evaluate to true in order to select and determine the zone Z1 and partition P12 for staging the updated metadata page G1.

Figure 13A:
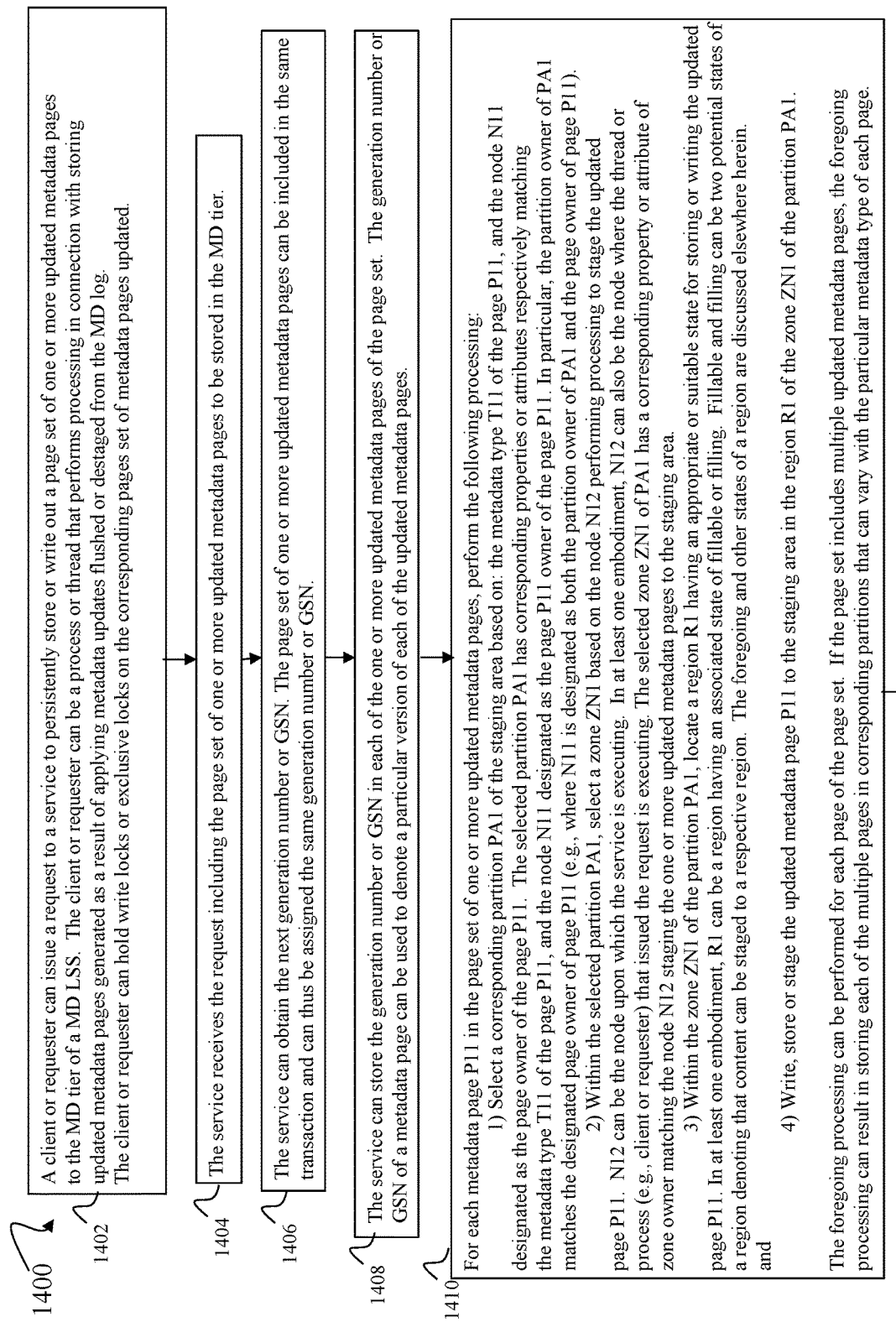
FIGS. 13A, 13B, 15 and 17 are flowcharts of processing steps that can be performed in at least one embodiment in accordance with the techniques of the present disclosure.
Figure 13B:
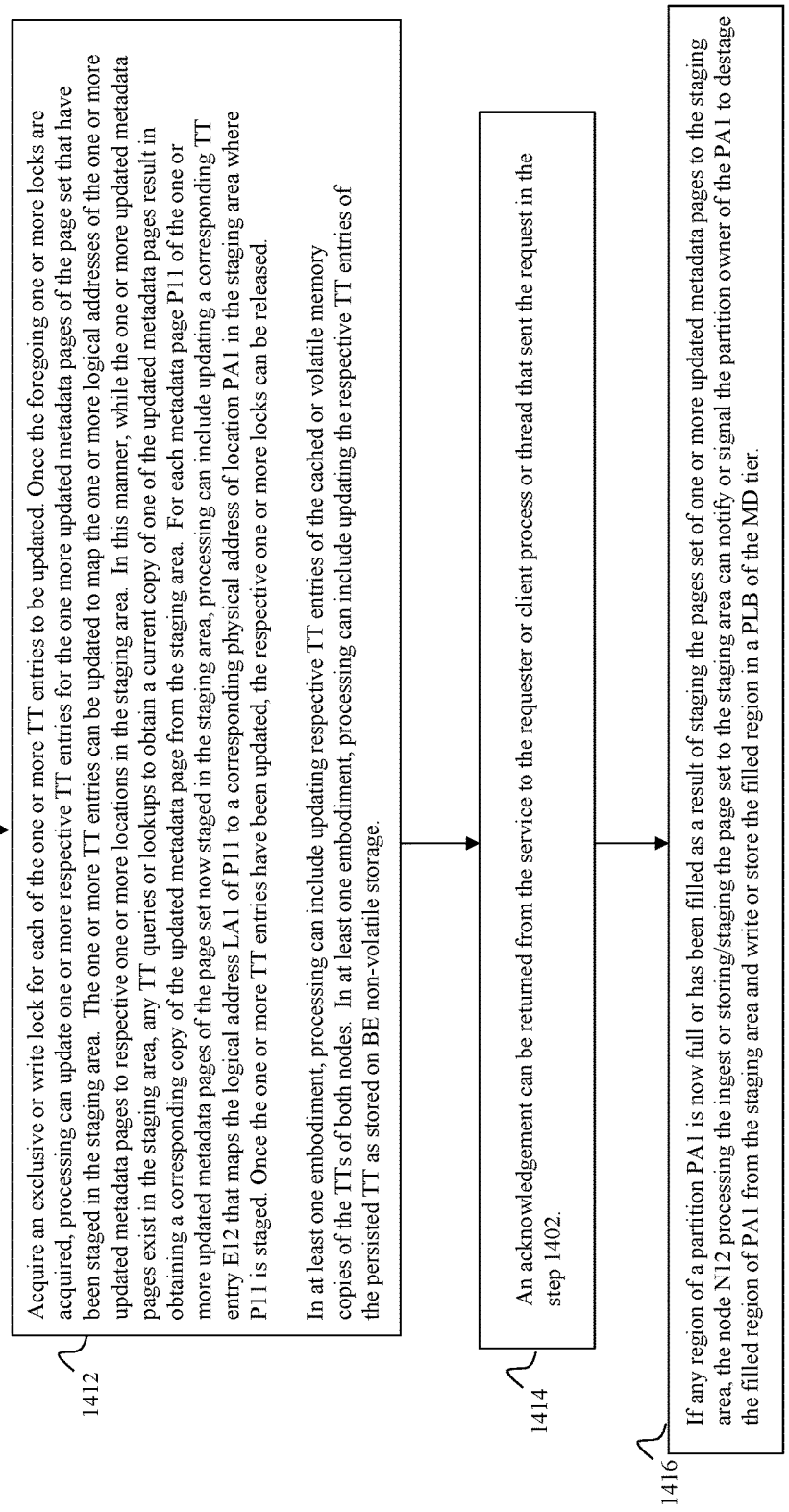

Referring to FIGS. 13A and 13B, shown is a flowchart 1400, 1401 of processing steps that can be performed in at least one embodiment in accordance with the techniques of the present disclosure. The steps of FIGS. 13A and 13B summarize processing discussed above. Processing of FIGS. 13A and 13B describes at least one embodiment where processing for staging an updated metadata page, and generally storing an updated metadata page in the MD tier, can be performed by issuing a request to a service. However, more generally, the processing described does not have to be embodied in a service.

At the step 1402, a client or requester can issue a request to a service to persistently store or write out a page set of one or more updated metadata pages to the MD tier of a MD LSS. The client or requester can be a process or thread that performs processing in connection with storing updated metadata pages generated as a result of applying metadata updates flushed or destaged from the MD log. The client or requester can hold write locks or exclusive locks on the corresponding pages set of metadata pages updated. The client or requester can be a process or thread executing on a node of the storage system.

In at least one embodiment, the MD page exclusive or write locks and the TT entry exclusive or write locks can be global in that the holder of such locks can have exclusive access to the respective resource across both nodes, or more generally, across the storage system. As a variation in at least one embodiment, the exclusive or write locks of a resource, such as for a TT entry, can be node local locks such that: i) a first node sends the update to the peer node, where the peer node acquires its node-local exclusive lock to update the peer node's resource and then updates the resource and then releases its local lock; and ii) then the first node acquires its own node-local exclusive lock on the TT entry or other resource, updates the TT entry or other resource and then releases the node-local lock.

In some embodiments, the requester and the service can be executing on the same node of the storage system. From the step 1402, control proceeds to the step 1404.

At the step 1404, the service receives the request including the page set of one or more updated metadata pages to be stored in the MD tier. From the step 1404, control proceeds to the step 1406.

At this point in at least one embodiment, processing of the steps 1406, 1408, 1410, 1412, 1414 and 1416 can be performed by the service.

At the step 1406, the service can obtain the next generation number or GSN. The page set of one or more updated metadata pages can be included in the same transaction and can thus be assigned the same generation number or GSN. From the step 1406, control proceeds to the step 1408.

At the step 1408, the service can store the generation number or GSN in each of the one or more updated metadata pages of the page set. The generation number or GSN of a metadata page can be used to denote a particular version of each of the updated metadata pages. From the step 1408, control proceeds to the step 1410.

At the step 1410, for each metadata page P11 in the page set of one or more updated metadata pages, the following processing can be performed:

1) Select a corresponding partition PA1 of the staging area based on: the metadata type T11 of the page P11, and the node N11 designated as the page owner of the page P11. The selected partition PA1 has corresponding properties or attributes respectively matching the metadata type T11 of the page P11, and the node N11 designated as the page P11 owner of the page P11. In particular, the partition owner of PA1 matches the designated page owner of page P11 (e.g., where N11 is designated as both the partition owner of PA1 and the page owner of page P11). Also, the metadata type T11 of the page P11 matches the metadata type of the selected partition PA1.

2) Within the selected partition PA1, select a zone ZN1 based on the node N12 performing processing to stage the updated page P11. N12 can be the node upon which the service is executing. In at least one embodiment, N12 can also be the node where the thread or process (e.g., client or requester) that issued the request is executing. The selected zone ZN1 of PA1 has a corresponding property or attribute of zone owner matching the node N12 staging or writing the one or more updated metadata pages to the staging area.

3) Within the zone ZN1 of the partition PA1, locate a region R1 having an appropriate or suitable state for storing or writing the updated page P11. In at least one embodiment, R1 can be a region having an associated state of fillable or filling. Fillable and filling can be two potential states of a region denoting that content can be staged to a respective region. The foregoing and other states of a region are discussed elsewhere herein.

and

4) Write, store or stage the updated metadata page P11 to the staging area in the region R1 of the zone ZN1 of the partition PA1.

The foregoing processing of the step 1410 can be performed for each page of the page set. If the page set includes multiple updated metadata pages, the foregoing processing of step 1410 performed for each page of the page set can result in storing each of the multiple pages in corresponding partitions that can vary with the particular metadata type of each page. From the step 1410, control proceeds to the step 1412.

At the step 1412, processing can be performed to acquire one or more write locks or exclusive locks on the respective one or more TT entries for the pages of the page set. Once the one or more write or exclusive locks on the TT entries for the pages of the page set are acquired, processing can update the one or more respective TT entries for the one more updated metadata pages of the page set that have been staged in the staging area. The one or more TT entries can be updated to map the one or more logical addresses of the one or more updated metadata pages to respective one or more locations in the staging area. In this manner, while the one or more updated metadata pages exist in the staging area, any TT queries or lookups to obtain a current copy of one of the updated metadata pages result in obtaining a corresponding copy of the updated metadata page from the staging area. For each metadata page P11 of the one or more updated metadata pages of the page set now staged in the staging area, processing can include updating a corresponding TT entry E12 that maps the logical address LA1 of P11 to a corresponding physical address of location PA1 in the staging area where P11 is staged. In at least one embodiment, processing can include updating respective TT entries of the cached or volatile memory copies of the TTs of both nodes. In at least one embodiment, processing can include updating the respective TT entries of the persisted TT as stored on BE non-volatile storage. After the one or more TT entries are updated, the one or more corresponding locks can be released. In at least one embodiment where the nodes independently generate and assign generation numbers or GSNs such as discussed elsewhere herein in connection with EQUATION 1, the step 1412 can also include the node currently writing into the staging area (e.g., the node upon which the service is executing) also notifying the peer node regarding the largest generation number or GSN just assigned in the step 1406.

In at least one embodiment, the steps 1410 and 1412 can be performed in parallel or concurrently.

From the step 1412, control proceeds to the step 1414.

At the step 1414, an acknowledgement can be returned from the service to the requester or client process or thread that sent the request in the step 1402. From the step 1414, control proceeds to the step 1416.

At the step 1416, if any region of the partition PA1 is now full or has been filled as a result of staging the pages set of one or more updated metadata pages to the staging area, the node N12 processing the ingest or storing/staging the page set to the staging area can notify or signal the partition owner of the PA1 to destage the filled region of PA1 from the staging area and write or store the filled region in a PLB of the MD tier. The partition owner of PA1 can be the node N12 itself or the peer node.

In at least one embodiment, once the requester or client thread or process receives the acknowledgement sent by the service in the step 1414, the requester or client can release the exclusive lock held on each page of the page set.

In at least one embodiment more generally, an exclusive lock or write lock can be acquired and held for a metadata page that is staged while the performing the processing of FIGS. 13A and 13B until processing of the step 1412 is completed. In at least one embodiment, an exclusive lock or write lock can be acquired and held for a TT entry of a metadata page that is staged while the performing the processing of FIGS. 13A and 13B until processing of the step 1412 is completed. Generally in at least one embodiment, the foregoing locks can be acquired and held by the requester or alternatively the service and can vary with embodiment depending on the understanding or agreement between executing processes. For example, the processing of FIGS. 13A and 13B includes a step 1402 where the service can presume that the requester or client has acquired and holds the necessary exclusive lock on each metadata page of the page set. In at least one embodiment, the step 1412 can include the service acquiring and holding the needed exclusive locks on TT entries for pages of the page set.

What will now be described in more detail is how regions can be filled and dispatched for destaging from the staging area to the MD tier in at least one embodiment in accordance with the techniques of the present disclosure.

In at least one embodiment, each region of a zone of a partition can be in one of the following states: fillable, filling, filled and destaging.

In at least one embodiment, a region in the fillable state can denote that the region is empty and its respective processing node (e.g., the zone owner) can start filling the region. Once the zone owner node starts filling the region, the region transitions from the fillable state to the filling state.

In at least one embodiment, a region in the filling state can denote that the region is in the process of being filled. In at least one embodiment, a distinction can be made between the states of filling and fillable, where a fillable region has no valid content and the fillable region's storage is waiting for processing to store content therein, and where a filling region is one that is in the process of being filled with content to be destaged to the MD tier such as responsive to the region transitioning from the filling state to the filled state (discussed below) when the region becomes full.

In at least one embodiment, a region in the filled state is one that can be characterized as full of staged content and can be destaged from the staging area to the MD tier. If a region of a partition is full, processing can be performed to notify the partition owner (node that owns the partition including the region) to commence writing the contents of the full region to the MD tier.

In at least one embodiment, a region in the destaging state is in the process of having its staged content destaged or written to the MD tier. Consistent with other discussion herein, a region in the destaged state is in the process of being destaged by the partition owner of the partition including the region.

Figure 14:
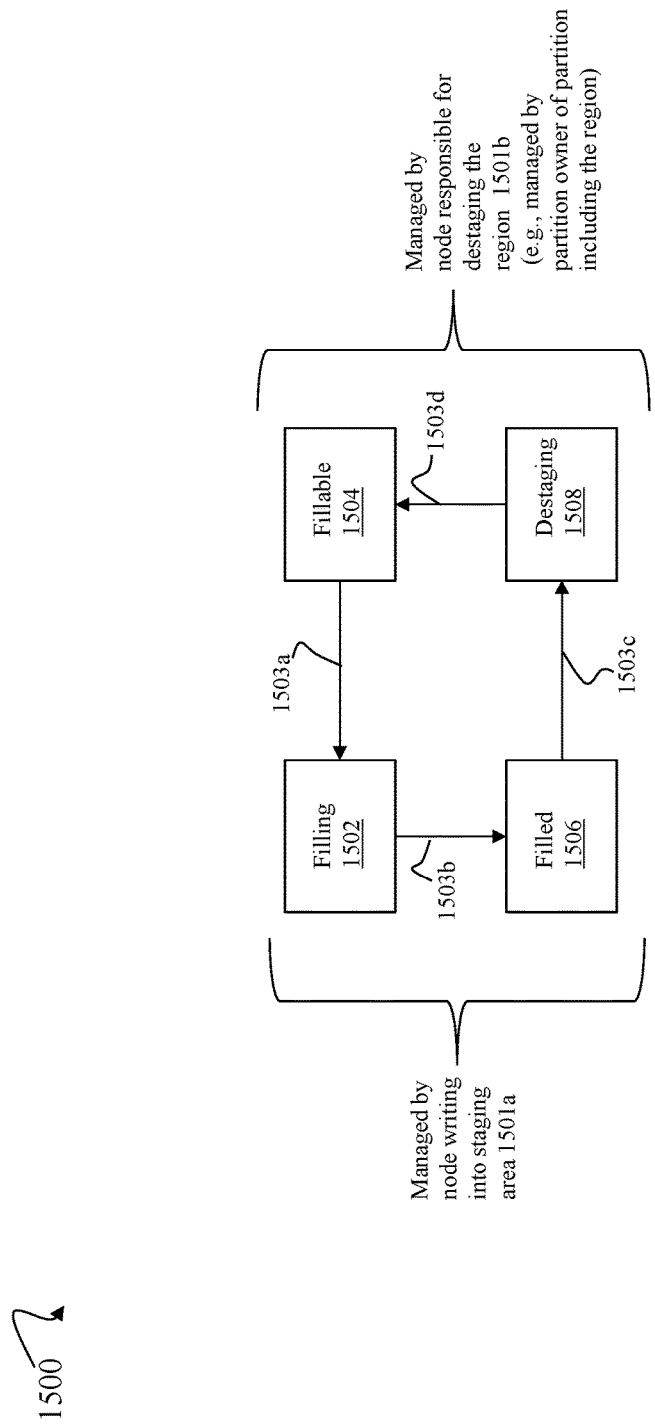

Referring to FIG. 14, shown is an example 1500 illustrating the various region states and transitions between such states in at least one embodiment in accordance with the techniques of the present disclosure.

The example 1500 illustrates the 4 possible defined states of a region as discussed above including: filling 1502, fillable 1504, filled 1506, and destaging 1508. Additionally, the example 1500 illustrates the allowable state transitions among the 4 possible region states. Initially, a region of a zone can be in the fillable state 1504 when the region is empty and is available and ready to be filled by the zone owner of the zone including the region. Once the zone owner node begins writing or staging content to the region, the region can transition (1503a) from the fillable state 1504 to the filling state 1502. Once a region is full (e.g., has been filled with content), the region can transition (1503b) from the filling state 1502 to the filled state 1506. Once a region of a partition has been filled (e.g. is in the filled state 1506), the partition owner of the partition including the region can be notified. In response to the notification, the partition owner can commence destaging content of the filled region such that the region can transition (1503c) from the filled state 1506 to the destaging state 1508. Once the region in the destaging state 1508 has been completely destaged such that all its content is written to a PLB of the MD tier, the region is empty and can transition (1503d) from the destaging state 1508 to the fillable state 1504.

In at least one embodiment, the filling state 1502 and filled or full state 1506 for a region can be managed (1501a) by the node writing into the region of the staging area. In particular, the region is included in a zone having a designated zone owner that is the node allowed to write into the zone, and regions of the zone. As such, the states 1502, 1506 for a region can be managed by the node designated as the zone owner of the zone including the region. The node (e.g., zone owner) processing the ingest and writing content to a zone can select and fill the corresponding regions of the zone. The zone owner node can select a region for storing an updated metadata page from candidate regions including regions in the fillable state 1504 and the filling state 1502. If the node selects to store an updated metadata page in a region in the fillable state 1504, the node can transition the fillable region's state from fillable 1504 to filling 1502. If the node writes content into a region in the filling state 1502 and the region becomes full, the node can transition the filling region's state from filling 1502 to filled 1506. Responsive to a region of a partition transitioning into the filled state 1506, the partition owner of the partition can be notified to destage content from the filled region to the MD tier. Once destaging for the region has commenced, the node performing the destaging (e.g., the partition owner) can update the region's state from filled 1506 to destaging 1508. Once the region has been completely destaged, the node destaging content from the region can update the region's state from destaging 1508 to fillable 1504. Once the region is placed in the fillable state 1504, the node responsible for filling the region can be notified that the region is now available for staging or storing content to be subsequently destaged or written out to the MD tier. Thus, the states 1504 and 1508 for a region can be managed by the node responsible for destaging content from the region to the MD tier.

In at least one embodiment, the various states of the regions in the staging area can be communicated among processes or threads executing on each node as part of processing in connection with writing or staging content into the staging area, and also destaging or writing out content from the staging area to the MD tier.

In at least one embodiment, each node can maintain in its own node-local volatile memory the various states of regions of the partitions of FIG. 12A.

In at least one embodiment, content can be destaged from the staging area on a region by region basis. In at least one embodiment where the size of a region is the size of a PLB of BE non-volatile storage, an entire region can be written or destaged into a single PLB of the MD tier. In at least one embodiment, metadata pages written or destaged from the staging area to the PLB of the MD tier can retain their respective generation number or GSNs from the staging area.

In at least one embodiment, when a node writes out or destages a metadata page from the staging area to the PLB of the MD tier, the node does not take a lock on the metadata page. In at least one embodiment before the node writes out or destages the metadata page from the staging area to the PLB of the MD tier, the node can acquire and hold an exclusive lock on the TT entry for the metadata page (e.g., where the TT entry maps the metadata page's logical address LA1 to the new physical address or location PA where the page is stored in the MD tier). While holding the exclusive lock on the TT entry for the metadata page, the node can: write out or destage the metadata from the staging area to the new location PA of the MD tier, and then update the TT entry to map LA1 to PA. After the metadata page has been destaged to its new location PA in the MD tier and the corresponding TT entry has been updated to map LA1 to PA, the node can release the lock on the TT entry for the metadata page.

Figure 15:
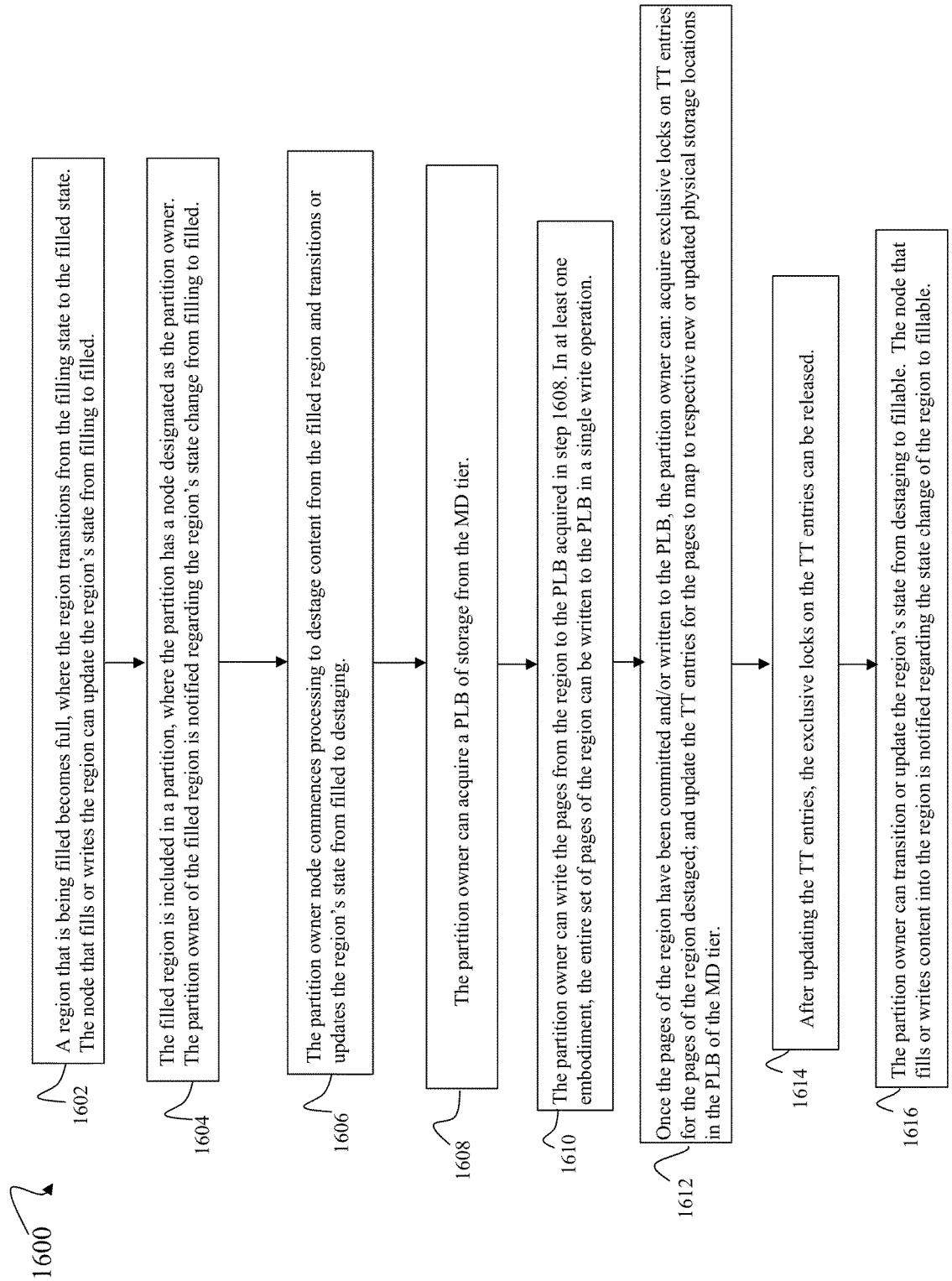

Referring to FIG. 15, shown is a flowchart 1600 of processing steps that can be performed in at least one embodiment in accordance with the techniques of the present disclosure.

The steps of FIG. 15 can be performed in connection with destaging or writing out content from a staging region to a PLB of the MD tier of BE non-volatile storage.

At the step 1602, a region that is being filled becomes full, where the region transitions from the filling state to the filled state. The node that fills or writes the region can update the region's state from filling to filled. From the step 1602, control proceeds to the step 1604.

At the step 1604, the filled region is included in a partition, where the partition has a node designated as the partition owner. The partition owner of the filled region is notified regarding the region's state change from filling to filled. In at least one embodiment, the node filling or writing to the region can notify the partition owner of the region's filled state. From the step 1604, control proceeds to the step 1606.

At the step 1606, the partition owner node commences processing to destage content from the filled region, and transitions or updates the region's state from filled to destaging. From the step 1606, control proceeds to the step 1608.

At the step 1608, the partition owner can acquire a PLB of storage from the MD tier. From the step 1608, control proceeds to the step 1610.

At the step 1610, the partition owner can write the pages from the region to the PLB acquired in step 1608. In at least one embodiment, the entire set of pages of the region can be written to the PLB in a single write operation. From the step 1610, control proceeds to the step 1612.

At the step 1612, once the pages of the region have been committed and/or written to the PLB, the partition owner can: acquire exclusive locks on TT entries for the pages of the region destaged; and update the TT entries for the pages to map to respective new or updated physical storage locations in the PLB of the MD tier. In at least one embodiment, the step 1612 can include updating volatile memory or cached TT entries of both nodes and also updating the persisted TT entries on BE non-volatile storage. From the step 1612, control proceeds to the step 1614.

At the step 1614, after updating the TT entries, the exclusive locks on the TT entries can be released.

In at least one embodiment, the exclusive or write locks of the TT entries can be global in that the holder of such locks can have exclusive access to the respective resource across both nodes, or more generally, across the storage system. As a variation in at least one embodiment, the exclusive or write locks of the TT entries can be node local locks such that: i) the partition owner sends the updates to the TT entries to the peer node, where the peer node acquires its node-local exclusive locks to update the peer node's volatile memory copy of the TT entries and then updates such TT entries and then releases its local locks; and ii) then the partition owner acquires its own node-local exclusive locks to the TT entries, updates such TT entries and then releases the node-local locks.

From the step 1614, control proceeds to the step 1616.

At the step 1616, the partition owner can transition or update the region's state from destaging to fillable. The node that fills or writes content into the region is notified regarding the state change of the region to fillable.

In at least one embodiment, there can be multiple versions of the same metadata page staged in different regions of the staging area and/or different zones of the staging area at the same time. Each version can be a different updated version of the metadata page at a different point in time. In order to distinguish between the multiple versions of the metadata page and also identify an associated age or recency of the multiple versions, generation numbers or GSNs can be used.

Consistent with other discussion herein, generation numbers or GSNs can be globally unique across both nodes of the storage system such that each time a new version or each time an updated version of a metadata page is generated, the new updated version of the metadata page is assigned a generation number or GSN that can be used to uniquely identify the new version and can also be used to identify which particular version of a metadata page is a most recent update to date version of the metadata page. In at least one embodiment, each assigned generation number or GSN can be a next unique sequence number from a monotonically increasing integer sequence. In this manner, the most recent version of a metadata page can be determined from multiple versions of the metadata page as the particular version with the largest associated generation number or GSN.

Generally, generation numbers or GSNs can be generated and assigned in any suitable manner. In at least one embodiment, each node can independently assign generation numbers or GSNs to transactions and thus to corresponding versions of updated metadata pages. In at least one such embodiment with a dual node storage system, a first node can assign only even generation number or GSNs and the remaining second node can assign only odd generation numbers or GSNs. When a node generates an updated version of a metadata page (or a transaction of multiple updated metadata pages), the node can locally assign the transaction and thus the corresponding one or more updated metadata pages a new sequence identifier or ID based on the algorithm expressed by the following EQUATION 1:

new sequence ID=MAX (largest assigned sequence ID on the node, largest received sequence ID from the peer node)+increment    EQUATION 1 where

MAX is a maximum function that returns the largest of its 2 arguments.

The "largest assigned sequence ID on the node" denotes the largest sequence ID the node has already assigned to a corresponding transaction of one or more updated metadata pages as generated by the node (e.g., where the node has generated and staged such updated metadata pages to the staging area).

The "largest received sequence ID from the peer node" denotes the largest sequence ID the node has received from the peer node in connection with the peer node processing a transaction of one or more updated metadata pages (e.g., where the peer node has generated and staged such updated metadata pages to the staging area). Thus the "largest received sequence ID from the peer node" denotes the largest sequence ID the peer node has already assigned to a transaction of one or more updated metadata pages staged to the staging area by the peer node.

In an embodiment with two nodes as described herein, the "increment" is either 1 or 2 so that sequence IDs generated locally by the first node, such as node A are always even, and sequence IDs generated locally by the remaining second or peer node, such as node B are always odd. In such an embodiment, a first of the two nodes is assigned the even numbered sequence IDs and a second of the two nodes is assigned the odd numbered sequence IDs denoting that the first node always generates only even numbered sequence IDs and the second node always generates odd numbered sequence IDs. In this manner, a node generating a new sequence ID based on EQUATION 1 adds either 1 or 2 to ensure that the new sequence ID is even (if the node is assigning the even numbered sequence IDs) or odd (if the node is assigned the odd numbered sequence IDs).

As each node assigns its next sequence ID denoting the largest sequence ID generated by the node, the node can send a message to the peer node to inform the peer node of the largest ID generated by the node. In at least one embodiment, a node can generate a new sequence ID denoting the next generation number or GSN assigned to by the node. In at least one embodiment, the node can assign the new or next generation number or GSN to a transaction of one or more updated metadata pages staged by the node. In at least one embodiment the generation number or GSN assigned to a transaction of one or more updated metadata pages being staged to the staging area can also be stored or recorded internally in each of the transaction's one or more updated metadata pages. In at least one embodiment, a corresponding generation number or GSN denoting the particular version of each metadata page can be stored in a reserved field at a defined position within the page.

The foregoing is an example of one way in which generation numbers or GSNs can be generated and assigned to versions of updated metadata pages in at least one embodiment in accordance with the techniques of the present disclosure. More generally, the two nodes can generate and assign monotonically increasing generation numbers or GSNs to each transaction of one or more metadata writes or updates in any suitable manner.

In at least one embodiment, each TT entry can generally identify the current physical location or address of the current or the most recent, up-to-date version of a particular metadata page. In accordance with the techniques of the present disclosure, since a metadata page can be accessed while temporarily held in the staging area, a TT entry can map the metadata page's logical address to a corresponding physical location or address in the MD tier of BE non-volatile storage, or a physical location or address in the staging area. In at least one embodiment, each TT entry denoting the logical to physical address mapping for a particular metadata page can also store the generation number or GSN denoting the particular version of the metadata page represented by the TT entry. In this manner, processing can be performed in at least one embodiment to ensure that the TT entry is not updated to incorrectly identify an older version of a metadata page as the current or most recent version. For example in at least one embodiment, a TT entry E1 can map a logical address LA for a metadata page M1 to a corresponding first physical address or location PA1 where the particular version or instances of M1 stored at PA1 has a corresponding GSN of GSN1. Processing can be performed to update the TT entry E1 to identify that the version of M1 as stored at PA2 with a corresponding GSN of GSN2 is the most/more recent version of page M1. In at least one embodiment, processing may allow E1 to be updated to map LA of page M1 to PA2 rather than PA1 only if GSN2>GSN1. (e.g. If GSN2>GSN1, then the version of page M1 stored at PA2 is more recent than the version of page M1 stored at PAL. In this scenario PA1 includes a stale version of the page M1 and PA2 includes the current version of the page M1). Otherwise, if GSN1>GSN2, then the TT entry E1 may not be updated since if GSN1>GSN2, then the version of the page M1 as stored at PA1 is more recent/more up to date than the other version of the page M1 as stored at PA2 (e.g., PA2 in this scenario includes a stale version of the page M1 and PA1 includes the current version of the page M1).

In at least one embodiment, processing described herein such as in FIGS. 13A-13B and 15 to update a TT entry may only update the TT entry if the TT entry is being updated to refer to a more recent version of a metadata page than the existing version identified by the TT entry based on the generation numbers or GSNs of the respective version of the metadata page.

Referring to FIG. 16, shown is an example 1700 illustrating a TT or translation table in at least one embodiment in accordance with the techniques of the present disclosure.

The TT 1702 can generally represent the layout and contents of the VLB TT and the MD TT such as discussed elsewhere herein.

The TT 1702 can include the following 3 columns of information: logical address or LA 1704, physical address or location 1706, and generation number or GSN 1708. Each row or entry of the TT 1702 can denote the logical to physical address or location mapping for a single corresponding metadata page. The TT 1702 can be queried to find the current persistently stored version of a metadata page if there is a cache miss with respect to a request to read the metadata page from cache such as in connection with the mapping information of a chain of metadata pages mapping a user data (UD) logical address to a physical address or location of content stored at the UD logical address.

In the example 1700, the TT 1702 can include entry 1720 for a first metadata page M1 having metadata page logical address LA1 (1704) that maps to a physical location or address "PLB1, offset1" (1706). The entry 1720 can indicate that the current or most recent version of metadata page M1 is stored in the MD tier of BE non-volatile storage at a particular PLB, denoted by PLB1, and at a particular offset, denoted by offset1, within the PLB1. The generation number or GSN of GSN99 (1708) denotes the current version number of the metadata page M1 as represented by the entry 1720.

In the example 1700, the TT 1702 can include entry 1722 for a second metadata page M2 having metadata page logical address LA15 (1704) that maps to a physical location or address "Partition3, offset10" (1706). The entry 1722 can indicate that the current or most recent version of metadata page M2 is stored in the staging area in the particular partition, denoted by Partition3, and at the particular offset, denoted by offset10, within Partition3. The generation number or GSN of GSN4 (1708) denotes the current version number of the metadata page M2 as represented by the entry 1722.

The TT 1702 can include other entries for other metadata pages besides the example entries 1720, 1722.

In at least one embodiment, each node can cache a node-local volatile memory copy of the TT that includes the information as in FIG. 16. In at least one embodiment, the TT can also be persistently stored on BE non-volatile storage where the persisted TT can omit the GSN or generation number information of column 1708.

In at least one embodiment, one scenario that can result from not locking each metadata page when destaging or writing the metadata page from the staging area to the MD tier of BE non-volatile storage is a potential race condition. In such a scenario, a client can obtain a physical address or location of a metadata page indicating that the page is in the staging area while the page is current being destaged or was just recently destaged. In at least one embodiment, while access to the metadata page can be restricted when writing the metadata page (or an updated version thereof) into the staging area by holding an exclusive lock on the metadata page, as discussed herein the metadata page itself may not be locked when destaging or writing out the metadata from the staging area to the MD tier of BE non-volatile storage.

Consider the following example. At time T1, thread 1 is a client or requester that acquires an exclusive lock on metadata page A and then issues a first request to the service as described in connection with FIGS. 13A and 13B to stage page A to the staging area. As a result, page A is stored at LOC1 of the staging area; and TT entry E1 maps the logical address LA1 of page A to LOC1 in the staging area.

At a time T2 subsequent to time T1, thread 2 performs processing to read a current version of page A and queries the TT. As a result of the TT query, the TT entry E1 mapping results in returning LOC1 of the staging area as the current location of page A. Thus thread 2 has LOC1 of the staging area as the current location of the most recent version of page A.

At a time T3 subsequent to time T2, thread 3 performs processing to destage or write out a region R1 of the staging area to the MD tier of BE non-volatile storage. The region R1 includes LOC1 and thus includes the page A. As a result, page A is stored at PA1 in a PLB of the MD tier on BE non-volatile storage; and the TT entry E1 maps the logical address LA1 of page A to PA1 to thereby denote that PA1 of the MD tier now contains the most recent version of page A. Also, as a result of destaging content from the region R1 of the staging area to the MD tier, storage of the region R1, including LOC1, can be freed or made available for storing new content.

At a time T4 subsequent to time T3, thread 4 issues a second request as a client to the service to as described in connection with FIGS. 13A and 13B to stage or write page B to the staging area. Thread 4 holds an exclusive lock on page 4 prior to issuing the second request and while the processing of FIGS. 13A and B is performed. As a result, page B can be written to the location LOC1 of region R1 since R1 was previously destaged at the third point in time T3.

At a time T5 subsequent to time T4, thread 2 now performs processing to read page A from LOC1 of the staging area based on the results of the prior TT query at the time T2. However, LOC1 now rather contains the page B rather than the page A. Thus, thread 2 reads an incorrect page B from LOC1 rather than the expected page A.

In connection with the foregoing scenario in at least one embodiment, processing can be performed by thread 2 to validate or verify the page or content read from LOC1 of the region R1 of the staging area.

In a first case, thread 2 can read LOC1 after page A has been destaged and also after LOC1 has been overwritten with a new page, such as page B. In at least one embodiment, each metadata page can have a self address or self identification (ID) field at a defined, known or expected location in the page read. In at least one embodiment, the self address or ID can be the logical address of the page. In this example, since thread 2 expected to read page A, thread 2 can compare the self ID field of the page or content read from LOC1 with the expected logical address LA1 of page 1. If the value of the self ID field of the page read from LOC1 does not match LA1, then validation processing of the page read at time T5 fails, where thread 2 can determine that it has not read a valid copy of page A. Thread 2 in this example knows the expected logical address LA1 of page A since thread 2 uses LA1 to query the TT for the current physical address or location of page A.

In a second case, thread 2 can read LOC1 after page A has been destaged and also while page B is in the process of being stored at LOC1. As such, page A of LOC1 may have been only partially overwritten with a new page, such as page B. In this case, the content read by thread 2 at time T5 is an invalid page as well. In at least one embodiment, a checksum value can be stored in a known, defined or expected location or field of each page. The checksum value can be used to verify and validate the page content read from LOC1.

The checksum can be used for data verification, such as to detect data corruption, regarding the content of the page read from LOC1. Checksums are generally known in the art and can be determined based on the current value or content of the page read. As a result, a first checksum can be computed based on the page read from LOC1 and compared to an expected checksum stored as a field or location of the page read from LOC1. If the first checksum and the expected checksum do not match, then validation processing of the page read at time T5 fails, where thread2 can determine that it has not read a valid copy of page A.

If either of the foregoing two cases occurs when a read of a metadata page is directed to the staging area (e.g., such as the read by thread 2 being directed to LOC1 of the staging area) such that validation processing of the page read fails, a corrective action can be taken. In at least one embodiment, the correction action can include: 1) rereading the corresponding TT entry E1 mapping the logical address LA1 for page A to obtain the current physical address or location of the current version of page A; and 2) rereading page A from the current physical address or location of E1. In connection with the above example, recall that the TT entry E1 including the mapping for page A was updated at time T3 as a result of destaging page A from LOC1 of the staging area to PA1 of the MD tier. After destaging page A at time T3, the TT entry E1 maps the logical address LA1 of page A to PA1 to thereby denote that PA1 of the MD tier now contains the most recent version of page A. As a result of rereading the TT entry E1, processing obtains PA1 of the MD tier as the physical address or location of the most recent or current version of page A. Thread 2 can now read page A from PA1 of the MD tier and perform validation processing. The validation processing can include any one or more of the above-noted checks performed using the self ID and checksum. In this example, the validation processing is successful and thread 2 continues processing using the current version of page A as read from PA1 of the MD tier.

In at least one embodiment, a second race condition can result from destaging a first version of a particular page (from the staging area to the MD tier) while also staging a second version of the same particular page (by writing the second version of the page to the staging area). In this case, updates made to the same TT entry for the page in connection with the foregoing destaging and staging operations can potentially result in an invalid TT entry that does not identify the current location of the most recent version of the page. Rather, due to the second race condition discussion below in more detail, the TT entry can rather reference a physical location or address of a stale version of the page that is not the current or most recent version of the page.

Consider the following example. At a time T11, node A can be destaging a region that includes a page Z having a generation number or GSN=10. As a result of the destaging, page Z can be written from the staging area to a new physical location PA3 in the MD tier of BE non-volatile storage. As described elsewhere herein such as in connection with FIG. 15 processing, the TT entry E2, that maps the logical address LA2 of page Z to the current physical address or location of the current version of page Z, can be updated to identify PA3 of the MD tier as the physical address or location of page Z. Additionally, node A can send a first message MSG1 to peer node B to also instruct node B to update its local cached copy of the TT entry E2 to map the logical address LA2 of page Z to PA3 in the MD tier. Additionally, node A can update its TT entry E2 to map LA2 to PA3 in the MD tier.

Also at the time T11 while node A is performing processing of FIG. 15 in connection with destaging page Z, node B can be staging an updated version of page Z having a generation number or GSN=11. As a result, node B can be performing processing of FIGS. 13A and 13B in parallel or concurrently while node A is performing processing of FIG. 15. In connection with node B performing processing of FIGS. 13A and 13B to stage page Z with GSN=11 to the staging area, node B can write page Z with GSN=11 to location LOC3 of the staging area. As described elsewhere herein such as in connection with FIGS. 13A-B processing, the TT entry E2, that maps the logical address LA2 of page Z to the current physical address or location of the current version of page Z, can be updated to identify LOC3 of the staging area as the physical address or location of page Z. Additionally, node B can send a second message MSG2 to peer node A to also instruct node A to update its TT entry E2 to map the logical address LA2 of page Z to LOC3 of the staging area. Additionally, node B can update its local cached copy of the TT entry E2 to map LA2 of page Z to LOC3 of the staging area.

The second race condition can result in connection with the order in which a node performs the above-noted updates to the entry E2. For example, it is possible that a node updates its node-local cached copy of the TT entry E2 to first map to LOC3 of the staging area, where LOC3 stages version GSN=11 of the page Z. Subsequently, the node can then map its local cached copy TT entry E2 to map to PA3 in the MD tier, where PA3 contains GSN=10 of the page Z. In this scenario, the TT entry E2 for page Z now incorrectly refers to the stale or outdated copy with GSN=10, rather than GSN=11, as the most current up to date version of the page Z. To avoid the foregoing scenario of the second race condition in at least one embodiment, a node can perform processing that checks the GSN or generation number associated with a TT entry update. If the GSN or generation number of the requested TT entry update is less than the current GSN or generation number of the TT entry, then the requested update is not performed. For example, if the GSN of the current TT entry E2 is 11 and the GSN of the requested TT entry E2 update is 10, then the node does not perform the requested TT entry E2 update. Alternatively, it may be that the node first updates its TT entry E2 to identify PA3 with GSN=10 as the current version of page Z. Subsequently, the node can then update its TT entry E2 to identify LOC3 with GSN=11 as the current version of page Z. In this latter case, the GSN of the current TT entry E2 has an associated GSN=10 when the subsequent request or instruction is received to update the current TT entry E2 to identify LOC3 with associated GSN=11 of page Z. In this latter case, the update to TT entry E2 can be performed because the current TT entry E2 has a GSN=10, which is less than the GSN=11 of the update request.

Figure 17:
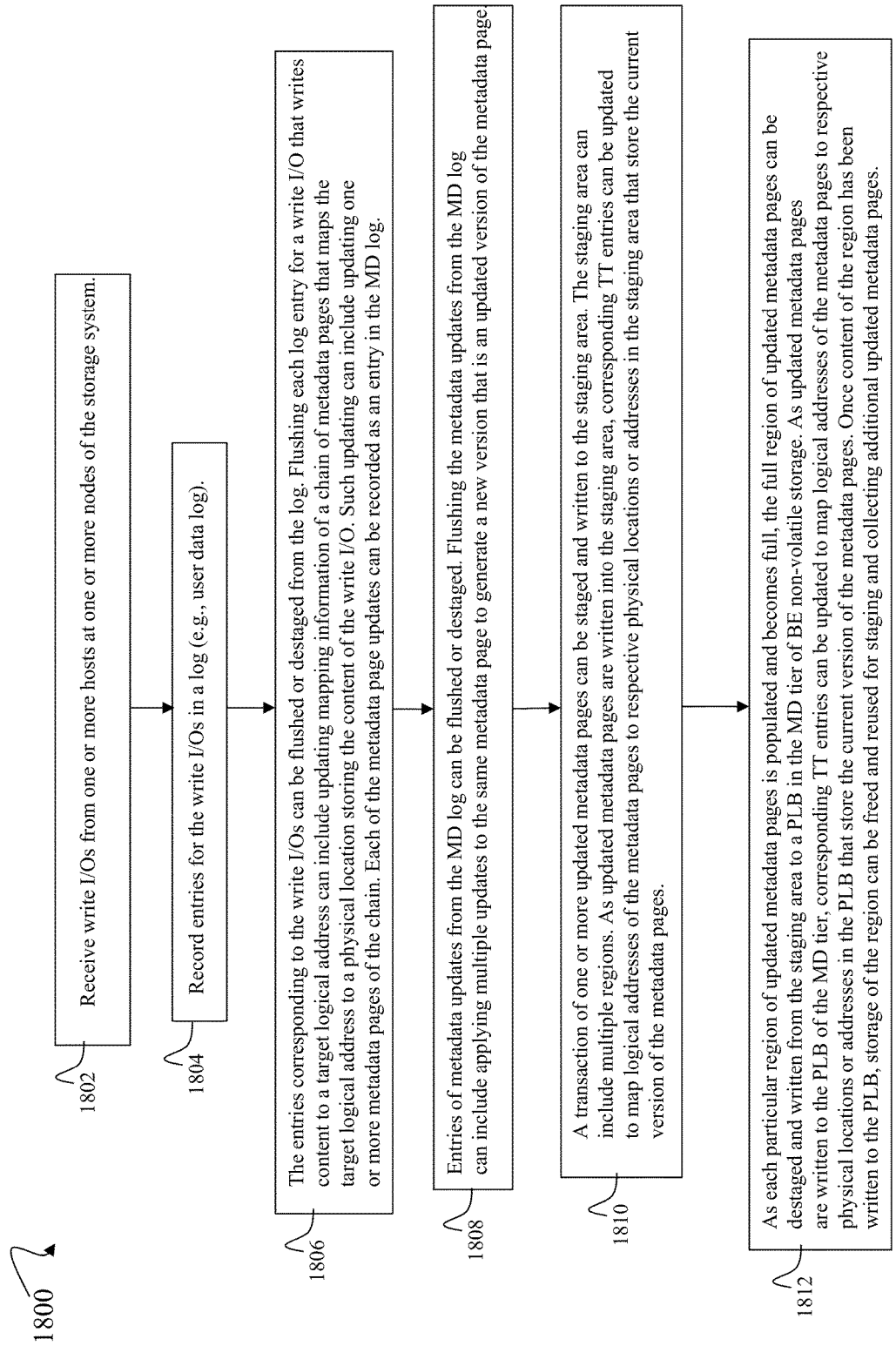

Referring to FIG. 17, shown is a flowchart 1800 of processing steps that can be performed in at least one embodiment in accordance with the techniques of the present disclosure. FIG. 17 summarizes processing steps described above.

At the step 1802, write I/Os can be received from one or more hosts at one or more nodes of the storage system. From the step 1802, control proceeds to the step 1804.

At the step 1804, entries for the write I/Os can be recorded in the log (e.g., user data (UD) log). From the step 1804, control proceeds to the step 1806, At the step 1806, the entries corresponding to and describing the write I/Os can be flushed or destaged from the log. Flushing each log entry for a write I/O that writes content to a target logical address can include updating mapping information of a chain of metadata pages that maps the target logical address to a physical location storing the content of the write I/O. Such updating can include updating one or more metadata pages of the chain. Each of the metadata page updates can be recorded as an entry in the MD log. From the step 1806, control proceeds to the step 1808.

At the step 1808, entries of metadata updates from the MD log can be flushed or destaged. Flushing the metadata updates from the MD log can include applying multiple updates to the same metadata page to generate a new version that is an updated version of the metadata page. From the step 1808, control proceeds to the step 1810.

At the step 1810, a transaction of one or more updated metadata pages can be staged and written to the staging area. The staging area can include multiple regions. As updated metadata pages are written into the staging area, corresponding TT entries can be updated to map logical addresses of the metadata pages to respective physical locations or addresses in the staging area that store the current version of the metadata pages. From the step 1810, control proceeds to the step 1812.

At the step 1812, as each particular region of updated metadata pages is populated and becomes full, the full region of updated metadata pages can be destaged and written from the staging area to a PLB in the MD tier of BE non-volatile storage. As updated metadata pages are written to the PLB of the MD tier, corresponding TT entries can be updated to map logical addresses of the metadata pages to respective physical locations or addresses in the PLB that store the current version of the metadata pages. Once content of the region of the staging area has been written to the PLB, storage of the region can be freed and reused for staging and collecting additional updated metadata pages.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving, at a storage system, a first write from a host, wherein the first write writes first content to a first logical address;
recording a first entry for the first write in a log;
flushing the first entry from the log;
responsive to said flushing the first entry, recording, in a metadata log, a first update to a first metadata page of a chain of pages that maps the first logical address to a first storage location or address storing the first content of the first logical address;
flushing the first update to the first metadata page from the metadata log;
generating an updated version of the first metadata page, wherein said generating the updated version of the first metadata page includes applying the first update to an existing version of the first metadata page; and
staging the updated version of the first metadata page to a staging area of a plurality of partitions, comprising:
selecting a first partition of the staging area based on: a first partition owner of the first partition, a first page owner of the first metadata page, a first metadata type of the first metadata page, and a second metadata type of the first partition;
selecting a first zone of the first partition based on a processing node performing said staging to write the updated version of the first metadata page to the staging area; and
writing the updated version of the first metadata page to a first location in a first region of the first zone of the first partition.

2. The computer-implemented method of claim 1, wherein said selecting the first partition includes:
determining that the first partition owner matches the first page owner.

3. The computer-implemented method of claim 2, wherein said selecting the first partition includes:
determining that the first metadata type of the first metadata page matches the second metadata type of the first partition.

4. The computer-implemented method of claim 1, wherein the first zone is included in a first plurality of zones of the first partition, wherein the first zone has a first zone owner identifying a first particular node allowed to file or write to the first zone, and wherein said selecting the first zone includes:
determining that the first particular node, that is the first zone owner, matches the processing node, that performs said staging to write the updated version of the first metadata page to the staging area.

5. The computer-implemented method of claim 4, wherein the storage system includes a first node and a second node, wherein the first node exclusively stages updated metadata pages to one of the first plurality of zones of the first partition, wherein the second node exclusively stages updated metadata pages to another one of the first plurality of zones of the first partition.

6. The computer-implemented method of claim 1, further comprising:
destaging a first plurality of updated metadata pages, including the updated version of the first metadata page, from the first region of the first partition to back-end non-volatile storage.

7. The computer-implemented method of claim 6, wherein the storage system includes a first node and a second node, wherein the first partition owner is the first node, and wherein the first node as the first partition owner is responsible for destaging content from the first partition to the back-end non-volatile storage, and wherein the first node performs said destaging the first plurality of updated metadata pages from the first region to the back-end non-volatile storage.

8. The computer-implemented method of claim 7, wherein the first node destages content from each region of the first partition responsive to said each region being filled with content.

9. The computer-implemented method of claim 7, wherein the first partition is divided into a first plurality of regions, wherein each of the first plurality of regions is one of a defined set of states including: a filling state, a fillable state, a filled state and a destaging state.

10. The computer-implemented method of claim 9, wherein the first region is in any of the fillable state and the filling state after the updated version of the first metadata page is written to the first location in the first region of the first zone of the first partition.

11. The computer-implemented method of claim 10, further comprising:
determining that the first region is full of updated metadata pages while the first region is in the filling state;
responsive to determining that the first region is full while in the filling state, transitioning the first region from the filling state to the filled state; and
responsive to said determining that the first region is in the filled state, performing processing including:
transitioning the first region from the filled state to the destaging state; and
performing said destaging the first plurality of updated metadata pages from the first region of the first partition to the back-end non-volatile storage.

12. The computer-implemented method of claim 11, further comprising:
transitioning the first region from the destaging state to the fillable state once said destaging the first region to the back-end non-volatile storage has completed.

13. The computer-implemented method of claim 6, further comprising:
acquiring a first plurality of exclusive locks for a first plurality translation table entries corresponding to the first plurality of updated metadata pages of the first region, where each of the first plurality of metadata pages of the first region has a corresponding one of the first plurality of translation table entries that maps a respective logical address of said each updated metadata page to a current physical address or location of said each updated metadata page; and
responsive to said acquiring, updating the first plurality of translation table entries to map a first plurality of logical addresses of the first plurality of updated metadata pages to a first plurality of respective storage locations on the back-end non-volatile storage.

14. The computer-implemented method of claim 13, further comprising:
subsequent to said updating the first plurality of translation table entries, releasing the first plurality of exclusive locks for the first plurality translation table entries.

15. The computer-implemented method of claim 1, further comprising:
prior to said staging the updated version, acquiring a first exclusive lock on the first metadata page;
responsive to writing the updated version of the first metadata page to the first location in the first region of the first zone of the first partition, performing processing including:
acquiring a second exclusive lock on a first translation table entry that maps a logical address of the first metadata page to a corresponding physical address or location of the first metadata page; and
updating the first translation table entry to map the logical address of the first metadata page to the first location of the first region of the first zone of the first partition in the staging area; and
subsequent to said updating the first translation table entry, releasing the first exclusive lock and the second exclusive lock.

16. The computer-implemented method of claim 1, further comprising:
receiving a first request to read the first metadata page;
determining that the first metadata page is not stored in a cache;
querying a translation table to determine a current physical location or address of the first metadata page, wherein the translation table includes a first translation entry mapping a logical address of the first metadata page to the current physical location or address of the first metadata page;
obtaining a current copy of the first metadata page from the current physical location or address as denoted by the first translation entry; and
returning the current copy of the first metadata page in response to the first request to read the first metadata page.

17. The computer-implemented method of claim 16, wherein the updated version of the first metadata page is stored in the staging area and the first translation entry maps the logical address of the first metadata page to the first location in the staging area as the current physical address or location of the first metadata page.

18. A system comprising:
one or more processors; and
a memory comprising code stored thereon that, when executed, performs a method comprising:
receiving, at a storage system, a first write from a host, wherein the first write writes first content to a first logical address;
recording a first entry for the first write in a log;
flushing the first entry from the log;
responsive to said flushing the first entry, recording, in a metadata log, a first update to a first metadata page of a chain of pages that maps the first logical address to a first storage location or address storing the first content of the first logical address;
flushing the first update to the first metadata page from the metadata log;
generating an updated version of the first metadata page, wherein said generating the updated version of the first metadata page includes applying the first update to an existing version of the first metadata page; and staging the updated version of the first metadata page to a staging area of a plurality of partitions, comprising:
selecting a first partition of the staging area based on:
a first partition owner of the first partition, a first page owner of the first metadata page, a first metadata type of the first metadata page, and a second metadata type of the first partition;
selecting a first zone of the first partition based on a processing node performing said staging to write the updated version of the first metadata page to the staging area; and
writing the updated version of the first metadata page to a first location in a first region of the first zone of the first partition.

19. One or more non-transitory computer readable media comprising code stored thereon that, when executed, perform a method comprising:
receiving, at a storage system, a first write from a host, wherein the first write writes first content to a first logical address;
recording a first entry for the first write in a log;
flushing the first entry from the log;
responsive to said flushing the first entry, recording, in a metadata log, a first update to a first metadata page of a chain of pages that maps the first logical address to a first storage location or address storing the first content of the first logical address;
flushing the first update to the first metadata page from the metadata log;
generating an updated version of the first metadata page, wherein said generating the updated version of the first metadata page includes applying the first update to an existing version of the first metadata page; and
staging the updated version of the first metadata page to a staging area of a plurality of partitions, comprising:
selecting a first partition of the staging area based on:
a first partition owner of the first partition, a first page owner of the first metadata page, a first metadata type of the first metadata page, and a second metadata type of the first partition;
selecting a first zone of the first partition based on a processing node performing said staging to write the updated version of the first metadata page to the staging area; and
writing the updated version of the first metadata page to a first location in a first region of the first zone of the first partition.

* * * * *